(12) United States Patent
Takano et al.

(10) Patent No.: US 8,543,783 B2
(45) Date of Patent: Sep. 24, 2013

(54) DATA STORAGE APPARATUS AND METHOD OF CONTROLLING DATA STORAGE APPARATUS

(71) Applicant: Fujitsu Limited, Kawasaki (JP)

(72) Inventors: Nobuhiro Takano, Machida (JP); Noriko Usui, Shinagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/769,768

(22) Filed: Feb. 18, 2013

(65) Prior Publication Data

US 2013/0166861 A1 Jun. 27, 2013

Related U.S. Application Data

(63) Continuation of application No. PCT/JP2010/064168, filed on Aug. 23, 2010.

(51) Int. Cl.
*G06F 13/00* (2006.01)

(52) U.S. Cl.
USPC .................................. 711/161; 711/E12.103

(58) Field of Classification Search
None
See application file for complete search history.

(56) References Cited

U.S. PATENT DOCUMENTS

| 2003/0051055 | A1 | 3/2003 | Parrella, Sr. et al. | |
|---|---|---|---|---|
| 2011/0285556 | A1* | 11/2011 | Nov | 341/51 |
| 2012/0310917 | A1* | 12/2012 | Sheinin et al. | 707/714 |

FOREIGN PATENT DOCUMENTS

| JP | 2000-222257 | 8/2000 |
|---|---|---|
| JP | 2000-339855 | 12/2000 |
| JP | 2004-535713 | 11/2004 |
| JP | 2005-293224 | 10/2005 |
| JP | 2006-100973 | 4/2006 |
| WO | WO-02/099677 | 12/2002 |

OTHER PUBLICATIONS

International Search Report, mailed in connection with PCT/JP2010/064168 and mailed Sep. 21, 2010.

* cited by examiner

*Primary Examiner* — Edward Dudek, Jr.
*Assistant Examiner* — Sean D Rossiter
(74) *Attorney, Agent, or Firm* — Fujitsu Patent Center

(57) ABSTRACT

A compressing unit generates a plurality of types of compressed blocks for each of divided blocks of data, by using a plurality of algorithm executing units. A comparing unit stores, in a storage unit, comparison result information on a compressed block having the smallest size. A writing start determining unit makes a decision to start writing of a write block and compression of a next block, when a quotient obtained by dividing the size of the compressed block that is indicated in the comparison result information by a writing speed is determined to be less than or equal to an elapsed time. A writing unit selects, as a write block, a compressed block having the smallest size among the generated compressed blocks at the time the start decision is made by the writing start determining unit, and writes the selected write block to a block storage unit.

9 Claims, 24 Drawing Sheets

COMPARISON RESULT TABLE 151a

| COMPRESSED BLOCK SIZE (MByte) | ALGORITHM | STORING BUFFER |
|---|---|---|
| 109 | D | 1 |

FIG. 6

WRITING START DETERMINATION TABLE 152a

| DIVIDED BLOCK SIZE (MByte) | ELAPSED TIME (seconds) | WRITING SPEED (MByte/s) | COMPRESSION STATE | | | | TIME LIMIT (seconds) |
| --- | --- | --- | --- | --- | --- | --- | --- |
| | | | ALGORITHM A | ALGORITHM B | ALGORITHM C | ALGORITHM D | |
| 200 | 8.1 | 20 | UNCOMPLETED | UNCOMPLETED | COMPLETED | COMPLETED | 15 |

FIG. 7

SETTING CONDITIONS FOR EXAMPLE AND
COMPARATIVE EXAMPLE

| DATA SIZE (MByte) | 1000 |
|---|---|
| DIVIDED BLOCK SIZE (MByte) | 200 |
| WRITING SPEED (MByte/s) | 20 |
| TIME LIMIT (seconds) | 15 |

FIG. 19

EXECUTION RESULT OF EXAMPLE

| COM-PRESSED BLOCK | COMPRESSION TIME (seconds) | | | | COMPRESSED BLOCK SIZE (MByte) | | | | UNCOM-PRESSED | ELAPSED TIME (seconds) | WRITE BLOCK SIZE (MByte) |
|---|---|---|---|---|---|---|---|---|---|---|---|
| | ALGORITHM | | | | ALGORITHM | | | | | | |
| | A | B | C | D | A | B | C | D | | | |
| 1 | 7 | 8 | <u>11</u> | 5 | 182 | 136 | <u>80</u> | 203 | 200 | 11 | 80 |
| 2 | (8) | (6) | (14) | (5) | (234) | (207) | (180) | (195) | <u>200</u> | 4 | 200 |
| 3 | <u>7</u> | 5 | (18) | 5 | <u>162</u> | 212 | (138) | 241 | 200 | 15 | 162 |
| 4 | 7 | 8 | <u>5</u> | (10) | 202 | 201 | <u>190</u> | (180) | 200 | 8.1 | 190 |
| 5 | (14) | (14) | 5 | <u>9</u> | (130) | (125) | 217 | <u>109</u> | 200 | 9.5 | 109 |
| WRITING | — | — | — | — | — | — | — | — | — | 5.5 | — |
| TOTAL | 43 | 41 | 53 | 34 | 910 | 881 | 805 | 928 | 1000 | 53.1 | 740 |

FIG. 20

COMPRESSION RESULT OF BLOCK 1

| SELECTED ALGORITHM | C |
|---|---|
| WRITE BLOCK SIZE (MByte) | 80 |
| ELAPSED TIME (seconds) | 11 |

FIG. 21A

COMPRESSION RESULT OF BLOCK 2

| SELECTED ALGORITHM | UNCOM-PRESSED |
|---|---|
| WRITE BLOCK SIZE (MByte) | 200 |
| ELAPSED TIME (seconds) | 4 |

FIG. 21B

COMPRESSION RESULT OF BLOCK 3

| SELECTED ALGORITHM | A |
|---|---|
| WRITE BLOCK SIZE (MByte) | 162 |
| ELAPSED TIME (seconds) | 15 |

FIG. 21C

COMPRESSION RESULT OF BLOCK 4

| SELECTED ALGORITHM | C |
|---|---|
| WRITE BLOCK SIZE (MByte) | 190 |
| ELAPSED TIME (seconds) | 8.1 |

FIG. 22A

COMPRESSION RESULT OF BLOCK 5

| SELECTED ALGORITHM | D |
|---|---|
| WRITE BLOCK SIZE (MByte) | 109 |
| ELAPSED TIME (seconds) | 9.5 |

FIG. 22B

WRITING RESULT OF BLOCK 5

| ELAPSED TIME (seconds) | 5.5 |
|---|---|

FIG. 22C

COMPARISON OF EXECUTION RESULTS OF EXAMPLE
AND COMPARATIVE EXAMPLE

| COMPRESSED BLOCK | EXAMPLE OF SECOND EMBODIMENT | | COMPARATIVE EXAMPLE | |
| --- | --- | --- | --- | --- |
| | ELAPSED TIME (seconds) | WRITE BLOCK SIZE (MByte) | ELAPSED TIME (seconds) | WRITE BLOCK SIZE (MByte) |
| 1 | 11 | 80 | 11 | 80 |
| 2 | 4 | 200 | 14 | 180 |
| 3 | 15 | 162 | 15 | 162 |
| 4 | 8.1 | 190 | 10 | 180 |
| 5 | 9.5 | 109 | 14 | 109 |
| WRITING | 5.5 | — | 5.5 | — |
| TOTAL | 53.1 | 740 | 69.5 | 710 |

FIG. 23

DATA STORAGE APPARATUS AND METHOD OF CONTROLLING DATA STORAGE APPARATUS

CROSS-REFERENCE TO RELATED APPLICATION

This application is a continuation application of International Application PCT/JP2010/064168 filed on Aug. 23, 2010 and designated the U.S., the entire contents of which are incorporated herein by reference.

FIELD

The embodiments discussed herein are related to a data storage apparatus and a method of controlling a data storage apparatus.

BACKGROUND

Information processing systems often perform an operation of storing a large amount of data in a storage medium. For instance, information systems store data in a storage device such as a Hard Disk Drive (HDD), and back up the data stored in the storage device into a storage medium in case of a failure or the like. When backing up data, for example, a magnetic tape is sometimes used as a storage medium due to its high capacity and high cost effectiveness in terms of storage capacity. Upon writing data to a storage medium, the data are compressed before being written. This reduces the data amount, and improves the usage efficiency of the storage medium.

It is known that, in the case of compressing data and writing the compressed data to a storage medium, the data may be divided into a plurality of blocks, and compression of a divided block and writing of an already compressed block into the storage medium may be performed in parallel in order to reduce the overall processing time. Further, there is a known technique that may be used in the above case. This technique compresses a single block with a plurality of different algorithms so as to generate a plurality of compressed blocks, and writes a compressed block having the highest compression rate (see, for example, Japanese Laid-open Patent Publications No. 2005-293224 and No. 2000-222257, and Japanese National Publication of International Patent Application. No. 2004-535713).

However, in the case where compression of one of divided blocks of data to be written and writing of the previous block that is already compressed are performed in parallel, even if compression of the block is completed, the previous compressed block may be still being written. In this case, writing of the next compressed block is not started until writing of the previous block is completed. This results in a waiting time in the compression process. Also, even if writing of the compressed block is completed, the next block may be still being compressed. In this case, writing of the next block is not started until compression thereof is completed. This results in a waiting time in the compression process. Accordingly, the processing time is increased, which reduces operating efficiency.

SUMMARY

According to one aspect of the present invention, there is provided a data storage apparatus that performs, for each of a plurality of divided blocks of data to be stored, writing of a compressed block of one of the divided blocks and compression of next one of the divided blocks in parallel. The data storage apparatus includes: a compressing unit including a plurality of algorithm executing units which compress one of the divided blocks of the data to be stored, using different algorithms in parallel, so as to generate compressed blocks, the compressing unit being configured to generate a plurality of types of compressed blocks for each one of the divided blocks by using the plurality of algorithm executing units; a storage unit configured to store comparison result information indicating one of the compressed blocks generated by the compressing unit and the size of the compressed block; a comparing unit configured to compare sizes of the compressed blocks generated by the respective algorithm executing units, and store, in the storage unit, comparison result information on a compressed block having the smallest size among the compressed blocks; a block storage unit to which the compressed block is written; a writing start determining unit configured to perform a start determination to determine whether a quotient obtained by dividing the size of the compressed block that is indicated in the comparison result information stored in the storage unit by a writing speed of writing the compressed block is less than or equal to an elapsed time from when compression of a previous divided block is started to when writing thereof is started and, when the quotient is determined to be less than or equal to the elapsed time, makes a decision to start writing of the generated compressed block to the block storage unit and compression of a next block of the data to be stored; and a writing unit configured to, when the start decision is made by the writing start determining unit, select as a write block a compressed block having the smallest size among the compressed blocks generated by the compressing unit at the time the start decision is made by the writing start determining unit, on the basis of the comparison result information stored in the storage unit, and write the selected write block to the block storage unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates a comparison result table according to the second embodiment;

FIG. 7 illustrates a writing start determination table according to the second embodiment;

FIG. 19 illustrates setting conditions for Example of the second embodiment and Comparative Example;

FIG. 20 illustrates execution results of Example of the second embodiment;

FIGS. 21A, 21B, and 21C illustrate the processing results of blocks according to the second embodiment;

FIGS. 22A, 22B, and 22C illustrate the processing results of blocks according to the second embodiment;

FIG. 23 illustrates a comparison of execution results of Example of the second embodiment and Comparative Example.

DESCRIPTION OF EMBODIMENTS

Figure 1:
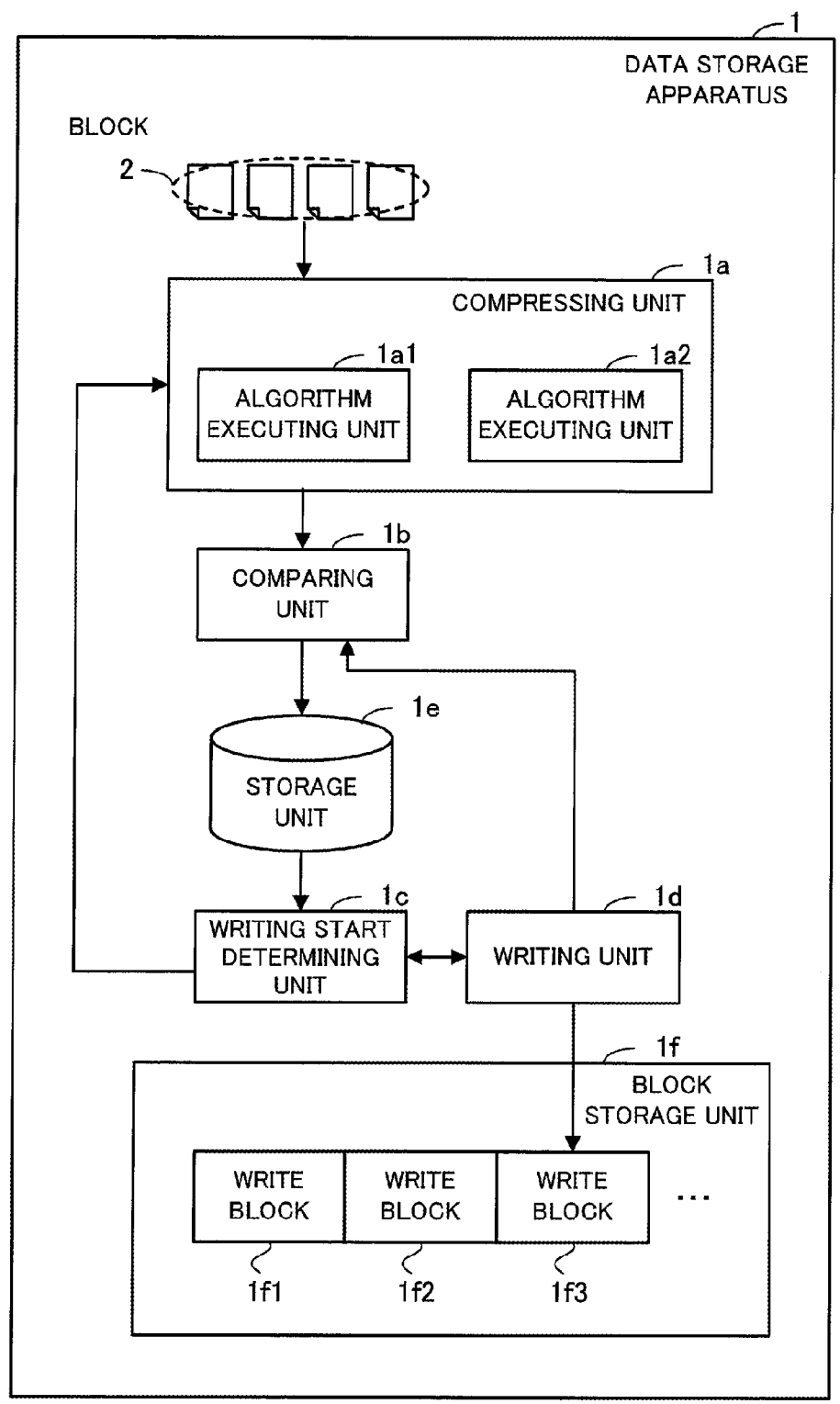
FIG. 1 illustrates a data storage apparatus according to a first embodiment.

Several embodiments will be described below with reference to the accompanying drawings, wherein like reference numerals refer to like elements throughout.

(a) First Embodiment

FIG. 1 illustrates a data storage apparatus 1 according to a first embodiment. The data storage apparatus 1 according to this embodiment is configured to start, for each of a plurality of divided blocks 2 of data to be stored, writing of a compressed block of one of the divided blocks 2 and compression of next one of the divided blocks 2 in parallel. The data storage apparatus 1 includes a compressing unit 1a, a comparing unit 1b, a writing start determining unit 1c, a writing unit 1d, a storage unit 1e, and a block storage unit 1f. The compressing unit 1a includes algorithm executing units 1a1 and 1a2.

The data storage apparatus 1 of this embodiment is capable of compressing the divided block 2 of the data with a plurality of algorithms. The data storage apparatus 1 dynamically determines which one of blocks compressed by different algorithms is to be selected as data to be actually written, on the basis of the time to be taken to compress the block 2, the time to be taken to write the compressed block to the block storage unit 1f, and the size of the block after compression.

The data storage apparatus 1 may obtain the divided blocks of the data to be stored from another apparatus through a communication line, or may obtain the divided blocks through a storage medium such a tape storage and a hard disk drive. Alternatively, the data storage apparatus 1 may have a function of dividing data so as to generate divided blocks. In this case, the data storage apparatus 1 may obtain data, and divide the obtained data so as to generate divided blocks, and compress and write the generated divided blocks.

The compressing unit 1a includes a plurality of algorithm executing units (e.g., algorithm executing units 1a1 and 1a2) which compress a divided block of the data to be stored, using different algorithms in parallel, so as to generate compressed blocks. The compressing unit 1a generates, for each divided block, a plurality of types of compressed blocks that are compressed with the different algorithms by using the algorithm executing units 1a1 and 1a2.

In the compressing unit 1a, if either one of the compression operations in the algorithm executing units 1a1 and 1a2 is not completed at the time a start decision is made, the compression operation that is not completed is terminated. Then, the writing unit 1d starts writing a selected write block, and the compressing unit 1a starts compressing the next block. With this configuration, even if a certain algorithm takes time to compress a divided block, it is possible to prevent the whole process from being delayed.

The comparing unit 1b compares the size of the compressed blocks generated by the respective algorithm executing units 1a1 and 1a2, and stores comparison result information in the storage unit 1e. The comparison result information indicates a compressed block having the smallest size among the compressed blocks generated by the algorithm executing units 1a1 and 1a2, and also indicates the size of the compressed block having the smallest size.

The writing start determining unit 1c performs a start determination to determine whether a quotient obtained by dividing the size of the compressed block that is indicated in the comparison result information stored in the storage unit 1e by a writing speed in the writing process is less than or equal to the elapsed time from when compression of a previous divided block is started to when writing thereof is started. If the writing start determining unit 1c determines that the quotient is less than or equal to the elapsed time, the writing start determining unit 1c makes a decision to start writing of the generated compressed block to the block storage unit 1f and compression of the next block of the data to be stored.

If a start decision is made by the writing start determining unit 1c, the writing unit 1d selects, on the basis of the comparison result information stored in the storage unit 1e, compressed blocks having the smallest size among the compressed blocks generated by the compressing unit 1a at the time the start decision is made by the writing start determining unit 1c as write blocks 1f1, 1f2, 1f3, and so on, and writes the selected write blocks 1f1, 1f2, 1f3, and so on to the block storage unit 1f.

The storage unit 1e stores the comparison result information indicating the compressed block generated by the compressing unit 1a and the size of the compressed block.

The block storage unit 1f has a storage area capable of storing compressed blocks. The block storage unit 1f stores the write blocks 1f1, 1f2, 1f3, and so on written by the writing unit 1d. The block storage unit 1f may be a tape storage using a magnetic tape, or may be a magnetic drive such as hard disk drive and Flexible Disk (FD), an optical disc such as Digital Versatile Disc (DVD), DVD-Random Access Memory (DVD-RAM), Compact Disc Read Only Memory (CD-ROM), CD-Recordable (CD-R), and CD-Rewritable (CD-RW), a magneto-optical drive such as Magneto-Optical Disk (MO), a non-volatile semiconductor memory such as Flash Solid State Drive (Flash SSD), or other storage apparatuses that are capable of storing data.

As described above, in the data storage apparatus 1, the writing start determining unit 1c performs a start determination, and decides whether to start writing of a compressed block and compression of the next block on the basis of the result of the start determination. Further, in the case where a start decision is made by the writing start determining unit $1c$, if either one of the compression operations in the algorithm executing units $1a1$ and the $1a2$ is not completed at the time the start decision is made, the compression operation that is not completed is terminated, and a block having the smallest size among the compressed blocks that are already generated at the time the start decision is made is selected as a write block. Then, the writing unit $1d$ starts writing the selected write block, and the compressing unit $1a$ starts compressing the next block. With this configuration, it is possible to increase the speed of storing data while preventing a reduction in compression rate.

(b) Second Embodiment

Next, a second embodiment will be described. In the second embodiment, a backup apparatus 100 implements the functions of the data storage apparatus 1 of FIG. 1 of compressing, using different algorithms, each of a plurality of divided blocks of data so as to generate compressed blocks, selecting one of the compressed blocks as a block to be written on the basis of the compression results when starting writing of the compressed block and compression of the next block, and storing the selected block.

Figure 2:
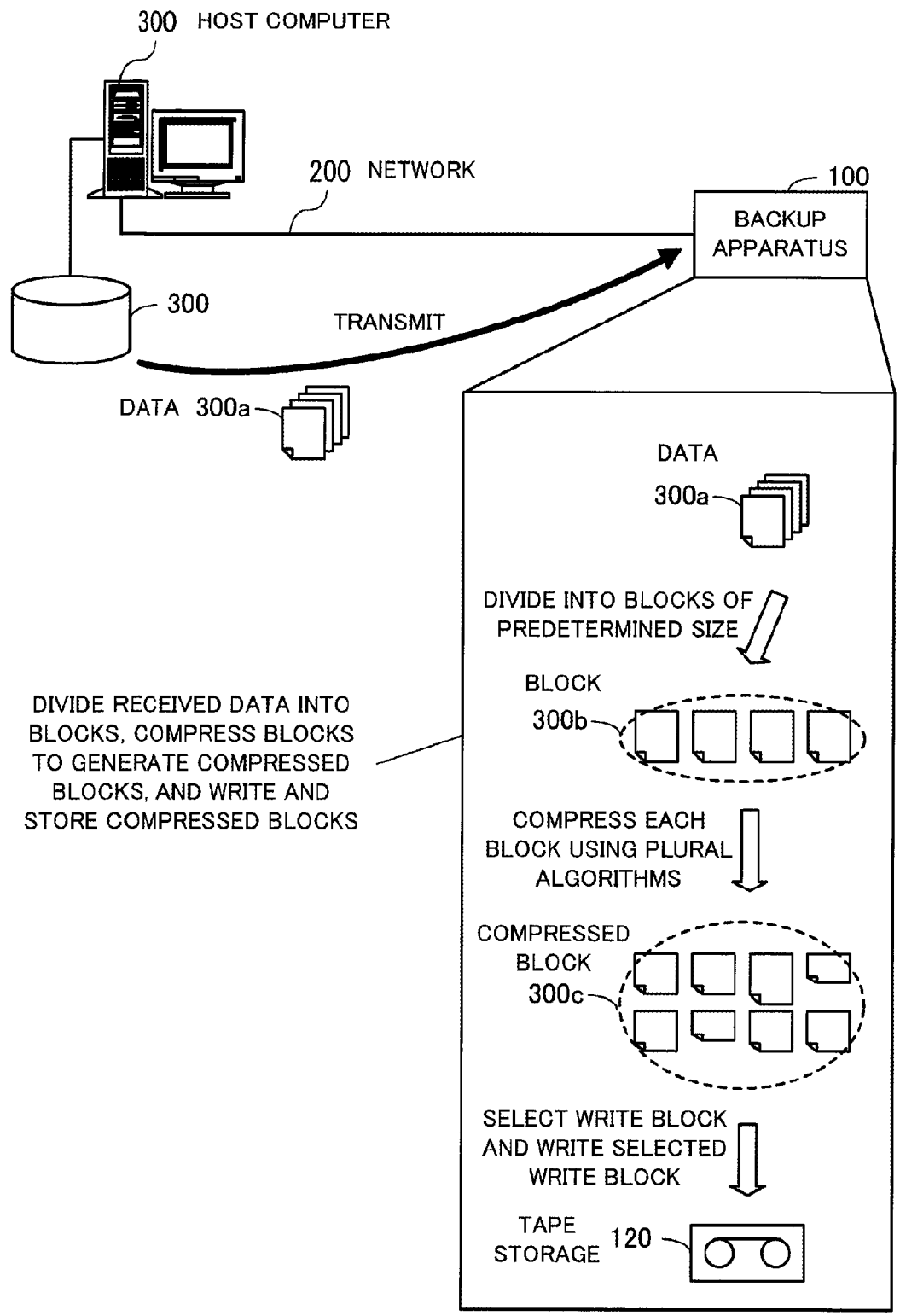
FIG. 2 illustrates a system configuration according to a second embodiment.

FIG. 2 illustrates a system configuration according to the second embodiment. The backup system of FIG. 2 includes the backup apparatus 100 and a host computer 300. The backup apparatus 100 and the host computer 300 are connected to each other so as to communicate through a network 200 such as a Local Area Network (LAN).

The backup apparatus 100 writes data 300a used by the host computer 300 to a storage device such as a tape storage 120, which uses a magnetic tape as a storage medium, and thereby backs up the data 300a.

Upon receiving the data 300a transmitted from the host computer 300, the backup apparatus 100 performs backup of the received data 300a. When performing backup, the backup apparatus 100 divides the received data 300a into blocks of a predetermined size (e.g., 200 MB), thereby generating a plurality of blocks 300b. Subsequently, as described below in greater detail, the backup apparatus 100 starts compression of one of the generated blocks 300b using a plurality of types of algorithms at the same time so as to generate compressed blocks 300c that are compressed with the plurality of different types of algorithms. Note that the generated blocks 300b are compressed one by one, starting with the first block. Then, the backup apparatus 100 selects one of the generated compressed blocks 300c as a block to be written to the tape storage 120, and writes and stores the selected write block in the tape storage 120. The backup apparatus 100 repeats these operations until the last block is processed. In this way, the backup apparatus 100 backs up the received data 300a.

The host computer 300 stores therein the data 300a. Further, the host computer 300 executes tasks using the stored data 300a. Note that the host computer 300 may store the data 300a in an external storage device (not illustrated) and read the data 300a from the storage device when needed.

Further, the host computer 300 performs operations such as schedule management and execution control of backup of the data 300a by the backup apparatus 100, and execution control of restoration using the data backed up in the backup apparatus 100.

Note that, although the backup apparatus 100 of this embodiment performs backup using the tape storage 120, the tape storage 120 is an example of a storage device, and other arbitrary storage devices such as hard disk drive, semiconductor memory, and optical disc drive may be used.

Figure 3:
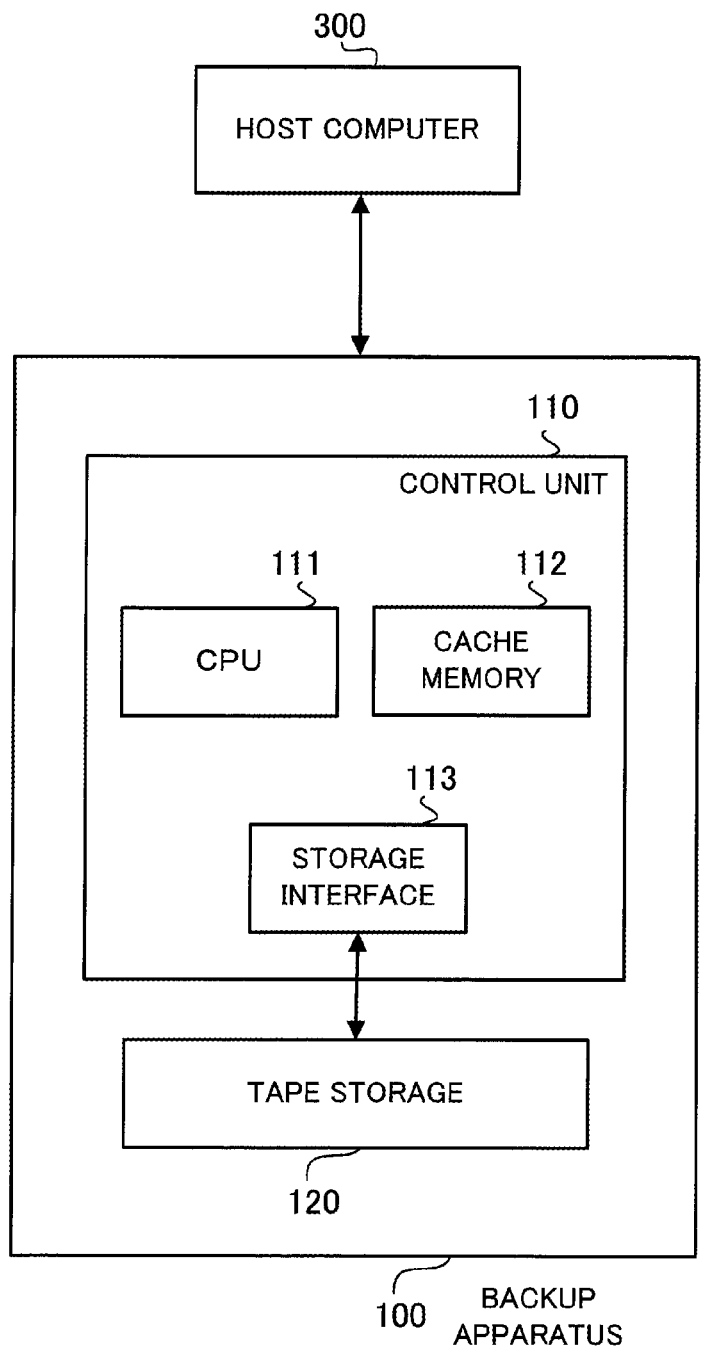
FIG. 3 illustrates the hardware configuration of a backup apparatus according to the second embodiment.

FIG. 3 illustrates the hardware configuration of the backup apparatus 100 according to the second embodiment. The backup apparatus 100 includes a control unit 110 that controls the entire operations of the backup apparatus 100, and the tape storage 120 that stores backup data of the data 300a transmitted from the host computer 300.

The control unit 110 includes a central processing unit (CPU) 111, a cache memory 112, and a storage interface 113.

The CPU 111 performs operations in accordance with the operating system (OS) and the like so as to perform various control operations. Further, the CPU 111 includes a timer that measures the elapsed time from when compression of the block by a compressing unit 103 (described below with reference to FIG. 4) is started.

The cache memory 112 stores control data needed by the CPU 111 for controlling the backup apparatus 100. Further, the cache memory 112 temporarily stores input data written to and output data read from the tape storage 120.

The storage interface 113 controls connection to the tape storage 120.

The tape storage 120 is a tape drive that reads data from and writes data to a replaceable magnetic tape, and stores backup data of data of the user of the system transmitted from the host computer 300.

Note that although the backup apparatus 100 reads backup data from and writes backup data to the tape storage 120 in this embodiment, a magnetic drive such as hard disk drive and flexible disk, an optical disc such as DVD, DVD-RAM, CD-ROM, CD-R, and CD-RW, a magneto-optical drive such as MO, a non-volatile semiconductor memory such as Flash SSD, or other storage apparatuses that are capable of storing data may alternatively be used.

With the hardware configuration described above, the processing functions of this embodiment may be realized.

Figure 4:
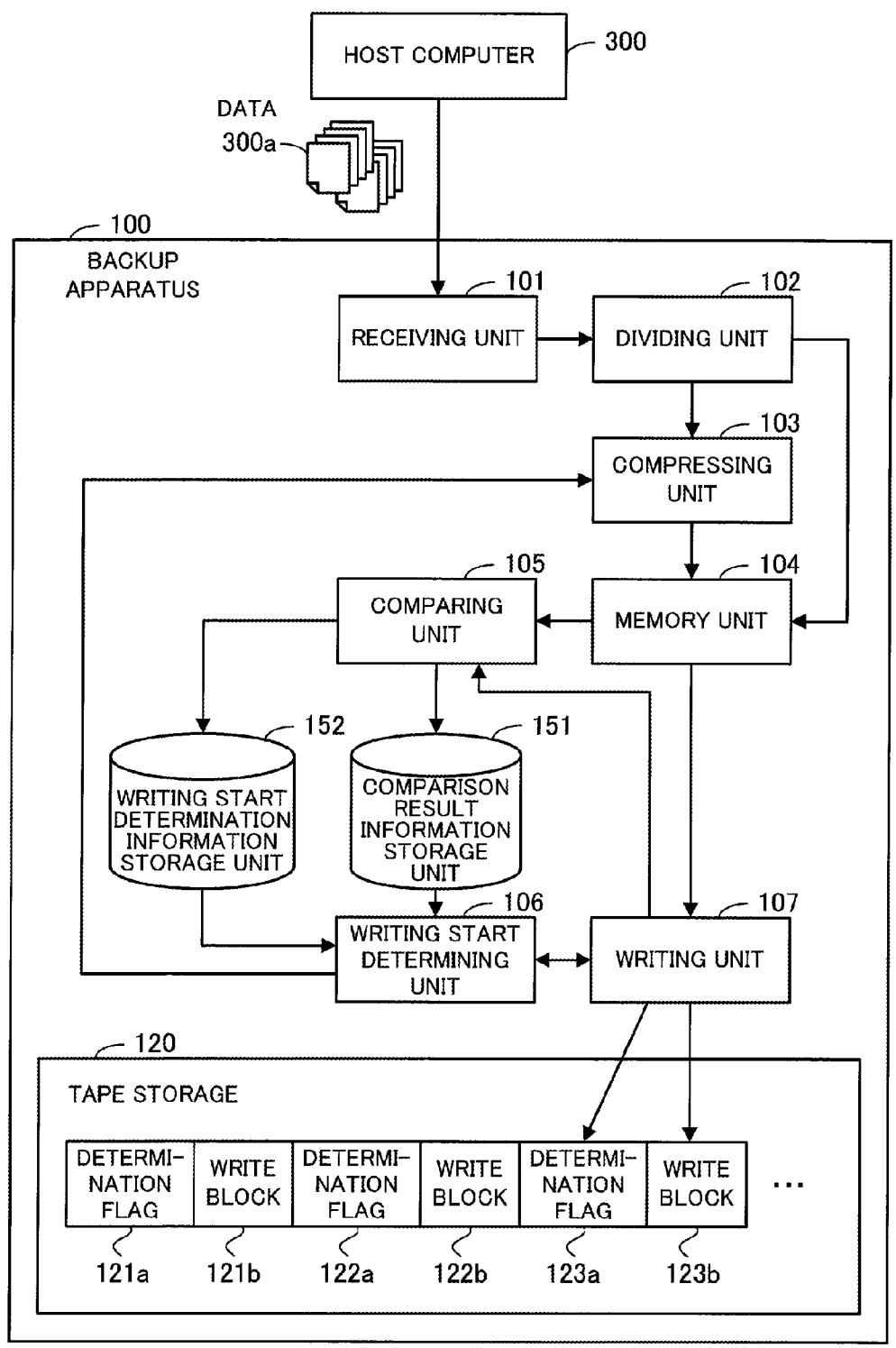
FIG. 4 is a functional block diagram of the backup apparatus according to the second embodiment.

FIG. 4 is a functional block diagram of the backup apparatus 100 according to the second embodiment. The backup apparatus 100 of this embodiment is connected to the host computer 300 through the network 200. The backup apparatus 100 obtains data 300a to be backed up, which are transmitted from the host computer 300, through the network 200, divides the received data 300a into blocks 300b as illustrated in FIG. 2, and compresses each block 300b using a plurality of types of algorithms so as to generate a plurality of types of compressed blocks 300c. Then, the backup apparatus 100 selects write blocks 121b, 122b, 123b, and so on to be written to the tape storage 120 from the compressed blocks 300c generated by the compression using the plurality of types of algorithms, and writes and stores, in the tape storage 120, the selected write blocks 121b, 122b, 123b, and so on, and determination flags 121a, 122a, 123a, and so on serving as control information of the respective write blocks 121b, 122b, 123b, and so on. The backup apparatus 100 includes a receiving unit 101, a dividing unit 102, the compressing unit 103, a memory unit 104, a comparing unit 105, a writing start determining unit 106, a writing unit 107, the tape storage 120, a comparison result information storage unit 151, and a writing start determination information storage unit 152.

The receiving unit 101 obtains data to be backed up from the host computer 300 through the network 200.

The dividing unit 102 divides the data obtained by the receiving unit 101 into blocks of a predetermined size (e.g., 200 MB). The compressing unit 103 compresses, using a plurality of types of algorithms, each block divided by the dividing unit 102 so as to generate compressed blocks. In parallel with storing the generated compressed blocks in the memory unit 104, the divided block is directly stored in the memory unit 104 without being compressed, in the same manner as the compressed blocks.

The compressing unit 103 includes a plurality of algorithm executing units (described below with reference to FIG. 5) which compress a divided block of the data to be stored, using different algorithms in parallel, so as to generate compressed blocks. The compressing unit 103 generates, for each divided block, a plurality of types of compressed blocks that are compressed with the different algorithms by using the respective algorithm executing units.

The memory unit 104 temporarily stores the blocks compressed by the compressing unit 103, and the blocks that are divided by the dividing unit 102 but are not compressed by the compressing unit 103.

The comparing unit 105 compares the size of the compressed blocks generated by the algorithm executing units and the size of the uncompressed divided block, and stores comparison result information in the comparison result information storage unit 151. The comparison result information indicates a block having the smallest size among the compressed blocks generated by the algorithm executing units and the uncompressed divided bock, and also indicates the size of the smallest block. Further, if a start decision is made by the writing start determining unit 106, the comparing unit 105 generates comparison result information on an uncompressed block (a block to be compressed), and stores the generated comparison result information in the comparison result information storage unit 151. Hereinafter, the term "compressed blocks" refer to the compressed blocks and the blocks that are divided by the dividing unit 102 but are not compressed by the compressing unit 103, if not otherwise specified.

Each time compression is completed by any of the algorithm executing units, the comparing unit 105 compares the size of the compressed block that is indicated in the comparison result information stored in the comparison result information storage unit 151 with the size of a compressed block that is newly generated by the algorithm executing unit. Then, if the size of the compressed block that is newly generated by the algorithm executing unit is less, the comparing unit 105 updates the comparison result information stored in the comparison result information storage unit 151 with comparison result information on the compressed block that is newly generated by the algorithm executing unit.

The writing start determining unit 106 performs a start determination to determine whether a quotient obtained by dividing the size of the compressed block that is indicated in the comparison result information stored in the comparison result information storage unit 151 by a writing speed in the writing process is less than or equal to the elapsed time from when compression of a previous block is started to when writing thereof is started. If the writing start determining unit 106 determines that the quotient is less than or equal to the elapsed time, the writing start determining unit 106 makes a decision to start writing of the generated compressed block to the tape storage 120 and compression of the next block of the data to be stored.

Further, the writing start determining unit 106 determines, in the start determination, whether the time limit (e.g., 15 seconds) has elapsed from the start of compression of the divided block by the compressing unit 103. If the writing start determining unit 106 determines that the time limit has elapsed, the writing start determining unit 106 makes a decision to start writing of the generated compressed block to the tape storage 120 and compression of the next block of the data to be stored.

Further, the writing start determining unit 106 determines, in the start determination, whether all the algorithm executing units have completed compression of the divided block. If the writing start determining unit 106 determines that all the algorithm executing units have completed compression of the divided block, the writing start determining unit 106 makes a decision to start writing of the generated compressed block to the tape storage 120 and compression of the next block of the data to be stored.

When writing of a previous write block by the writing unit 107 is completed, or when the comparison result information stored in the comparison result information storage unit 151 is updated by the comparing unit 105, the writing start determining unit 106 performs a start determination. Further, the writing start determining unit 106 may perform a start determination each time a predetermined time period (e.g., 1 second) elapses.

If a start decision is made by the writing start determining unit 106, the writing unit 107 selects, on the basis of the comparison result information stored in the comparison result information storage unit 151, compressed blocks having the smallest size among the compressed blocks generated by the compressing unit 103 at the time the start decision is made by the writing start determining unit 106 as write blocks 121*b*, 122*b*, 123*b*, and so on, and reads the selected write blocks 121*b*, 122*b*, 123*b* and so on from the memory unit 104 so as to write the write blocks 121*b*, 122*b*, 123*b* and so on to the tape storage 120. At this point, the writing unit 107 writes to the tape storage 120 the write blocks 121*b*, 122*b*, 123*b* and so on, together with the determination flags 121*a*, 122*a*, 123*a*, and so on, which are associated with the respective write blocks 121*b*, 122*b*, 123*b* and so on and indicate control information of the respective write blocks 121*b*, 122*b*, 123*b* and so on. The determination flags 121*a*, 122*a*, 123*a*, and so on indicate with which algorithm the corresponding write blocks 121*b*, 122*b*, 123*b* and so on are compressed, the data lengths and the like of the corresponding write blocks 121*b*, 122*b*, 123*b* and so on, and are written in front of the corresponding write blocks 121*b*, 122*b*, 123*b* and so on. Note that the determination flags 121*a*, 122*a*, 123*a*, and so on may be written behind the corresponding write blocks 121*b*, 122*b*, 123*b* and so on, or may be collectively written to another area of the magnetic tape, another magnetic tape, or other storage media and the like.

A magnetic tape capable of writing and reading compressed blocks may be loaded into the tape storage 120. In the tape storage 120, the write blocks 121*b*, 122*b*, 123*b* and so on are written to the loaded magnetic tape by the writing unit 107. The tape storage 120 serves as a block storage unit.

The comparison result information storage unit 151 stores the comparison result information indicating the compressed block generated by the compressing unit 103 and the size of the compressed block. The comparing unit 105 refers to the latest comparing result information stored in the comparison result information storage unit 151, compares the size of the compressed blocks, and updates the comparison result information if the size of the newly generated compressed block is the smallest. The comparison result information storage unit 151 is an example of a storage unit.

The writing start determination information storage unit 152 stores writing start determination information to be used by the writing start determining unit 106 for performing a start determination. The writing start determining information indicates the size of blocks into which the data 300*a* is divided by the dividing unit 102, the elapsed time from when compression of a previous block is started to when writing thereof is started, the writing speed of the writing unit 107 to the tape storage 120, the state of compression by the algorithm executing units of the compressing unit 103 at that moment, and the time limit for compression by the compressing unit 103.

Note that although the backup apparatus 100 of this embodiment receives data from the host computer 300 through the network 200, the configuration is not limited thereto. For example, the backup apparatus 100 may obtain data from the tape storage 120, other types of tape storage, or storage devices such as a hard disk drive (not illustrated).

Figure 5:
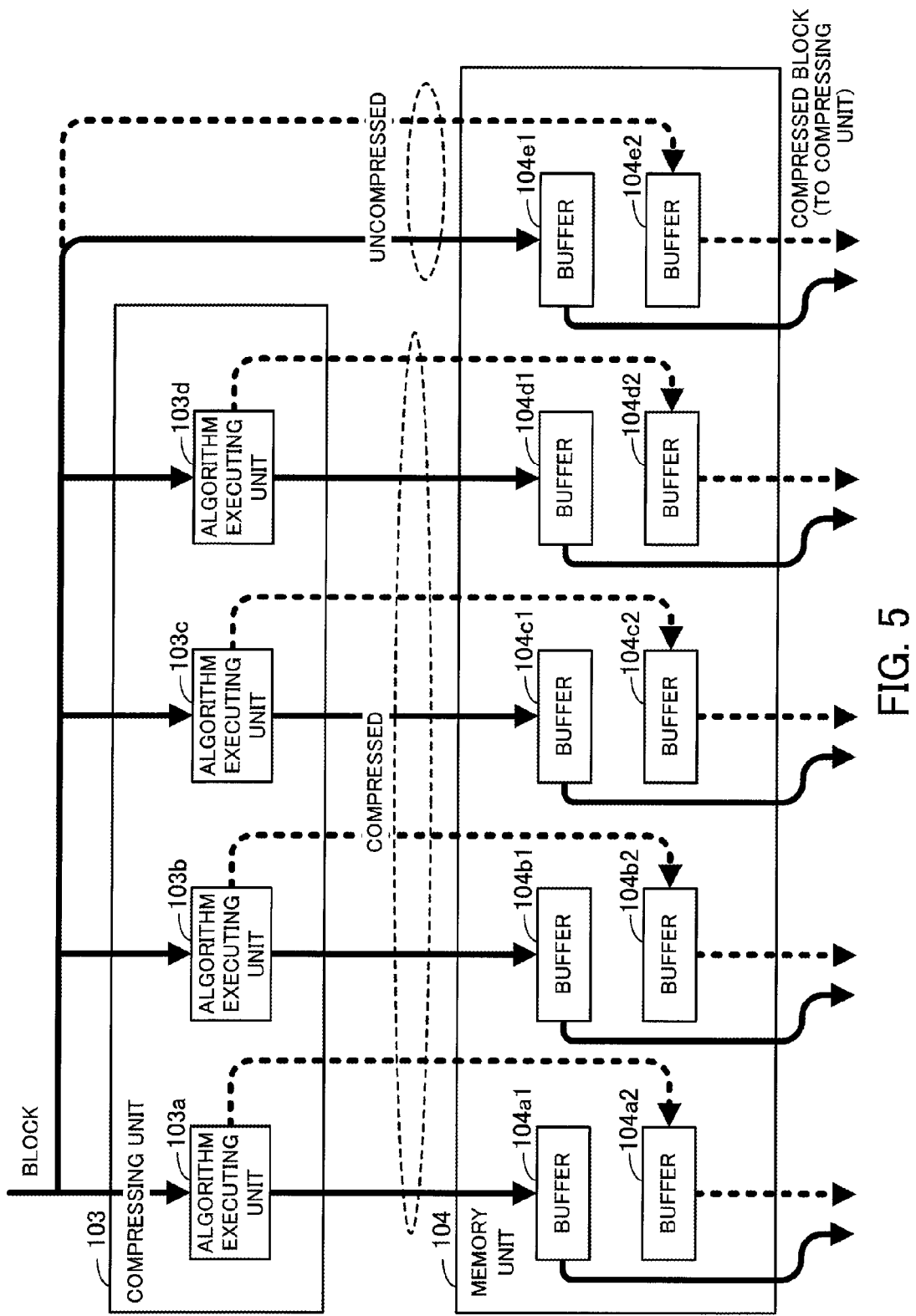
FIG. 5 illustrates operations of a compressing unit and a memory unit according to the second embodiment.

FIG. 5 illustrates operations of the compressing unit 103 and the memory unit 104 according to the second embodiment. The compressing unit 103 of this embodiment includes algorithm executing units 103a, 103b, 103c, and 103d. The memory unit 104 includes buffers 104a1, 104a2, 104b1, 104b2, 104c1, 104c2, 104d1, 104d2, 104e1, and 104e2.

The algorithm executing units 103a, 103b, 103c, and 103d execute compression using different compression algorithms. Examples of algorithms executed by the algorithm executing units 103a through 103d may include Adaptive Lossless Data Compression (ALDC), Data Compression according to Lempel and Ziv (DCLZ), ZIP, CABinet (CAB), LZA, G Compression Archiver (GCA), and other compression algorithms. In this embodiment, it is assumed that the compression algorithm executed by the algorithm executing unit 103a is an algorithm A. Similarly, the compression algorithm executed by the algorithm executing unit 103b is an algorithm B. The compression algorithm executed by the algorithm executing unit 103c is an algorithm C. The compression algorithm executed by the algorithm executing unit 103d is an algorithm D.

The buffers 104a1, 104b1, 104c1, 104d1, and 104e1 and the buffers 104a2, 104b2, 104c2, 104d2, and 104e2 are alternately used for divided blocks of data. The buffers 104a1, 104b1, 104c1, and 104d1, and the buffers 104a2, 104b2, 104c2, and 104d2 alternately temporarily store compressed blocks that are generated by the corresponding algorithm executing units 103a through 103d. The buffers 104e1 and 104e2 alternately temporarily store a block that is not compressed (an uncompressed block).

For example, it is assumed that compression of the first block of the divided data 300a is started. In this case, the first block is first stored without being compressed, in the buffer 104e1 out of the buffers 104e1 and 104e2 that are configured to store uncompressed blocks, for example. Then, when the algorithm executing unit 103a compresses the first block so as to generate a compressed block, the compressed block generated by the algorithm executing unit 103a is stored in the buffer 104a1 out of the buffers 104a1 and 104a2 corresponding to the algorithm executing unit 103a. Similarly, when the algorithm executing units 103b, 103c, and 103d generate compressed blocks, the compressed blocks generated by the algorithm executing units 103b, 103c, and 103d are stored respectively in the buffers 104b1, 104c1, and 104d1 out of the buffers 104b1, 104c1, and 104d1 and the buffers 104b2, 104c2, and 104d2, corresponding to the algorithm executing unit 103b, 103c, and 103d, respectively.

Subsequently, a start decision is made by the writing start determining unit 106, and compression of the second block of the data 300a is started. Then, the second block is stored in the buffer 104e2, which is not used for the first block, out of the buffers 104e1 and 104e2 that are configured to store uncompressed blocks. Similarly, when the algorithm executing unit 103a compresses the second block so as to generate a compressed block, the compressed block generated by the algorithm executing unit 103a is stored in the buffer 104a2, which is not used for the compressed block of the first block, out of the buffers 104a1 and 104a2 corresponding to the algorithm executing unit 103a. Similarly, when the algorithm executing units 103b through 103d generate compressed blocks, the compressed blocks are stored respectively in the buffers 104b2 through 104d2 out of the buffers 104b1 through 104d1 and the buffers 104b2 through 104d2 corresponding to the algorithm executing unit 103b through 103d, respectively. When compression of the third block is started, the buffers 104a1, 104b1, 104c1, 104d1, and 104e1 are used after the compressed blocks that are stored therein are discarded. When compression of the fourth block is started, the buffers 104a2, 104b2, 104c2, 104d2, and 104e2 are used after the compressed blocks that are stored therein are discarded.

As described above, in the memory unit 104 of this embodiment, the buffers 104a1, 104b1, 104c1, 104d1, and 104e1 and the buffers 104a2, 104b2, 104c2, 104d2, and 104e2 are alternately used for each block. Therefore, the previous compressed block remains even after compression of the next block is started. Accordingly, it is possible to perform compression of the next block during writing of the previous block, and thus to perform compression of the next block without waiting for completion of writing of the previous block. This may reduce the processing time.

FIG. 6 illustrates a comparison result table 151a according to the second embodiment. The comparison result table 151a of FIG. 6 is stored in the comparison result information storage unit 151 of the backup apparatus 100. The comparison result table 151a stores comparison result information indicating information of a compressed block having the smallest size among the already compressed blocks, at that moment during compression of a certain block, on the basis of the results of a comparison operation by the comparing unit 105 of the backup apparatus 100.

The comparison result table 151a includes items of "compressed block seize", "algorithm", and "storing buffer". In the comparison result table 151a, records in the respective items arranged in the same row are associated with each other as comparison result information.

The "compressed block size" indicates, in megabytes, the size of the compressed block that is determined to have the smallest size from the results of the comparison by the comparing unit 105 at that moment. Note that if the uncompressed block is determined to have the smallest size at that moment, the size of the uncompressed block is stored in the column of the "compressed block size".

The "algorithm" indicates the algorithm with which the compressed block determined to have the smallest size at that moment from the results of the comparison by the comparing unit 105 at that moment is compressed.

The "storing buffer" indicates the buffer which stores the compressed block that is determined to have the smallest size from the results of comparison by the comparing unit 105 at that moment. In the backup apparatus 100 of this embodiment, the memory unit 104 includes the buffers 104a1 through 104e2 that form pairs of buffers respectively corresponding to the algorithm executing units 103a through 103d of the compressing unit 103 and uncompressed data. More specifically, the buffers 104a1 and 104a2 are associated with the algorithm executing unit 103a. The buffers 104b1 and 104b2 are associated with the algorithm executing unit 103b. The buffers 104c1 and 104c2 are associated with the algorithm executing unit 103c. The buffers 104d1 and 104d2 are associated with the algorithm executing unit 103d. The buffers 104e1 and 104e2 are associated with uncompressed data.

In this embodiment, information stored in the column of the "storing buffer" in the comparison result table 151a indicates which of the two associated buffers a corresponding one of the blocks compressed by the algorithm executing units 103a through 103d and the uncompressed block is stored. For example, if the block compressed by the algorithm executing unit 103d indicated in the comparison result information is stored in the buffer 104d1 out of the buffers 104d1 and 104d2 corresponding to the algorithm executing unit 103d, "1" is stored in the column of the "storing buffer" as illustrated in FIG. 6. On the other hand, if the block compressed by the algorithm executing unit 103d indicated in the comparison result information is stored in the buffer 104d2, "2" is stored in the column of the "storing buffer".

The determination of the size of the compressed block by the comparing unit 105 is a temporary determination. More specifically, the comparing unit 105 first generates comparison result information on an uncompressed block, and stores the generated comparison result information in the comparison result information storage unit 151. Subsequently, when compression using any one of the algorithms is completed, the comparing unit 105 compares the size of the newly generated compressed block with the size of the uncompressed block stored in the comparison result information storage unit 151. On the basis of the results of the comparison, if the compressed block size indicated in the comparison result information stored in the comparison result information storage unit 151 is less, the comparing unit 105 does not update the comparison result information stored in the comparison result information storage unit 151. On the other hand, on the basis of the results of the comparison, if the size of the newly generated compressed block is less, the comparing unit 105 generates comparison result information on the newly generated compressed block, and updates the comparison result information stored in the comparison result information storage unit 151 with the comparison result information on the newly generated compressed block. In the process that follows, each time compression using an algorithm is completed, the comparing unit 105 compares the size of a newly generated compressed block with the compressed block size indicated in the comparison result information stored in the comparison result information storage unit 151, and updates the comparison result information on the basis of the comparison results.

FIG. 7 illustrates a writing start determination table 152a according to the second embodiment. The writing start determination table 152a of FIG. 7 is stored in the writing start determination information storage unit 152 of the backup apparatus 100. The writing start determination table 152a stores writing start determination information to be used by the writing start determining unit 106 of the backup apparatus 100 for determining whether to start writing of a compressed block and compression of the next block.

The writing start determination table 152a includes items of "divided block size", "elapsed time", "writing speed", "compression state", and "time limit". In the writing start determination table 152a, records in the respective items arranged in the same row are associated with each other as writing start determination information.

The "divided block size" indicates, in megabytes, the size of blocks into which data is divided by the dividing unit 102. The dividing unit 102 divides the data 300a transmitted from the host computer 300 into blocks of this divided block size.

The "elapsed time" indicates, in seconds, the time taken to complete the previous step. The term "the time taken to complete the previous step" as used herein refers to the time taken from the start of the last completed compression and the last completed writing of a write block, which are performed in parallel before a certain step, to the completion of both the compression and writing.

The "writing speed" indicates, in megabytes per second, the speed at which the tape storage 120 writes a compressed block to the magnetic tape. The elapsed time is a quotient obtained by dividing the size of the compressed block to be written by the writing speed.

The "compression state" indicates whether compression of a current block by the algorithm executing units 103a through 103d of the compressing unit 103 is completed. If compression using an algorithm is completed, "completed" is stored in the column corresponding to the algorithm. If compression using an algorithm is not completed, "uncompleted" is stored in the column corresponding to the algorithm.

The "time limit" indicates, in seconds, the time limit for terminating compression of a block and starting writing of a write block and compression of the next block. Compression is terminated even if not all the algorithms have completed compression of the block. In the case where writing of the previous block is completed, if compression of the current block is completed by all the algorithms, if the time limit from the start of compression of the current block has elapsed, or if a determination conditional expression is satisfied, the compression of the current block is terminated. Then, writing to the tape storage 120 the compressed block indicated in the comparison result information stored in the comparison result information storage unit 151 at that moment is started, and compression of the next block using the respective algorithms is started.

Note that the divided block size and the time limit may be arbitrarily set. The writing speed is determined in accordance with the processing performance of the backup apparatus 100 and the tape storage 120. The elapsed time varies each time compression of a previous block is completed. The compression state varies each time any one of compression operations by the algorithm executing units 103a through 103d of the compressing unit 103 is completed.

The determination conditional expression used herein is the following Expression (1):

$$\text{SIZE/SPEED} \leq \text{TIME} \quad (1),$$

wherein SIZE is the size (megabyte) of the compressed block indicated in the comparison result information on the current block, SPEED is the speed of writing to the tape storage 120, and TIME is the elapsed time from when compression of the previous block and writing is started to when compression of the current block and writing is started. If the current block is the first block of the data 300a, there is no "previous block", and therefore the elapsed time is 0. Accordingly, TIME=0.

Note that, since the first block of the data 300a has no "previous block", the comparing unit 105 may omit a determination for the first block of the data 300a as to whether writing of the previous block is completed. Also, since the first block of the data 300a has no "previous block", the determination conditional expression is not satisfied. Accordingly, the comparing unit 105 may omit a determination for the first block of the data 300a as to whether the determination conditional expression is satisfied.

Figure 8:
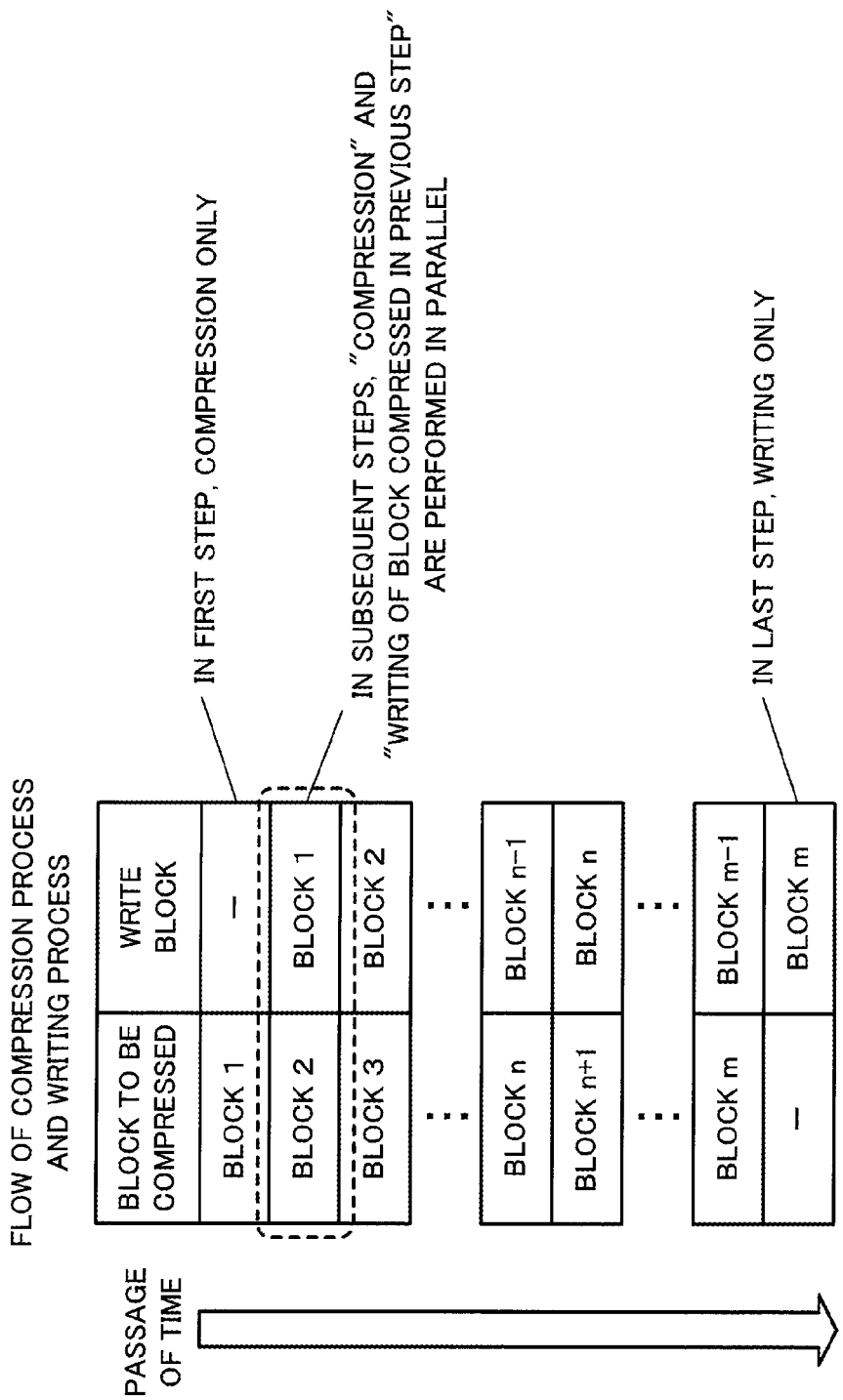
FIG. 8 illustrates how a compression process and a writing process proceed according to the second embodiment.

FIG. 8 illustrates how a compression process and a writing process proceed according to the second embodiment. The following describes how a compression process and a writing process in the backup apparatus 100 of this embodiment proceed with reference to FIG. 8.

The backup apparatus 100 may perform compression of a block and writing of a block in parallel. Each row in FIG. 8 indicates a step to be performed with the passage of time. The "block to be compressed" indicates the block to be compressed in each step. The "write block" indicates the compressed block to be written in each step. In each step, compression and writing are performed at the same time on the respective blocks illustrated in the same row. Further, in each step, a compressed block to be written by the writing unit 107 is a block compressed by the compressing unit 103 in the previous step.

More specifically, in the backup apparatus 100, compression is performed on the first block (block 1) of data transmitted from the host computer 300 in the first step. On the other hand, in the first step, since there is no already compressed block, writing of a compressed block is not performed.

In the second step, compression of a second block (block 2), and writing of the block 1 that is already compressed in the first step are performed. In the third step, compression of the third block (block 3), and writing of the block 2 that is already compressed in the second step are performed.

Similarly, in the n-th step, compression of an n-th block (block n), and writing of a block n−1 that is already compressed in the (n−1)-th step are performed. In the (n+1)-th step, compression of an (n+1)-th block (block n+1) and writing of the block n that is already compressed in the n-th step are performed.

Further, in the m-th step, compression of an m-th block (block m) and writing of a block m−1 that is already compressed in the (m−1)-th step are performed. In the last step (the (m+1)-th step), since all the blocks are already compressed, compression is not performed. On the other hand, writing of the block m that is already compressed in the m-th step is performed.

Figure 9:
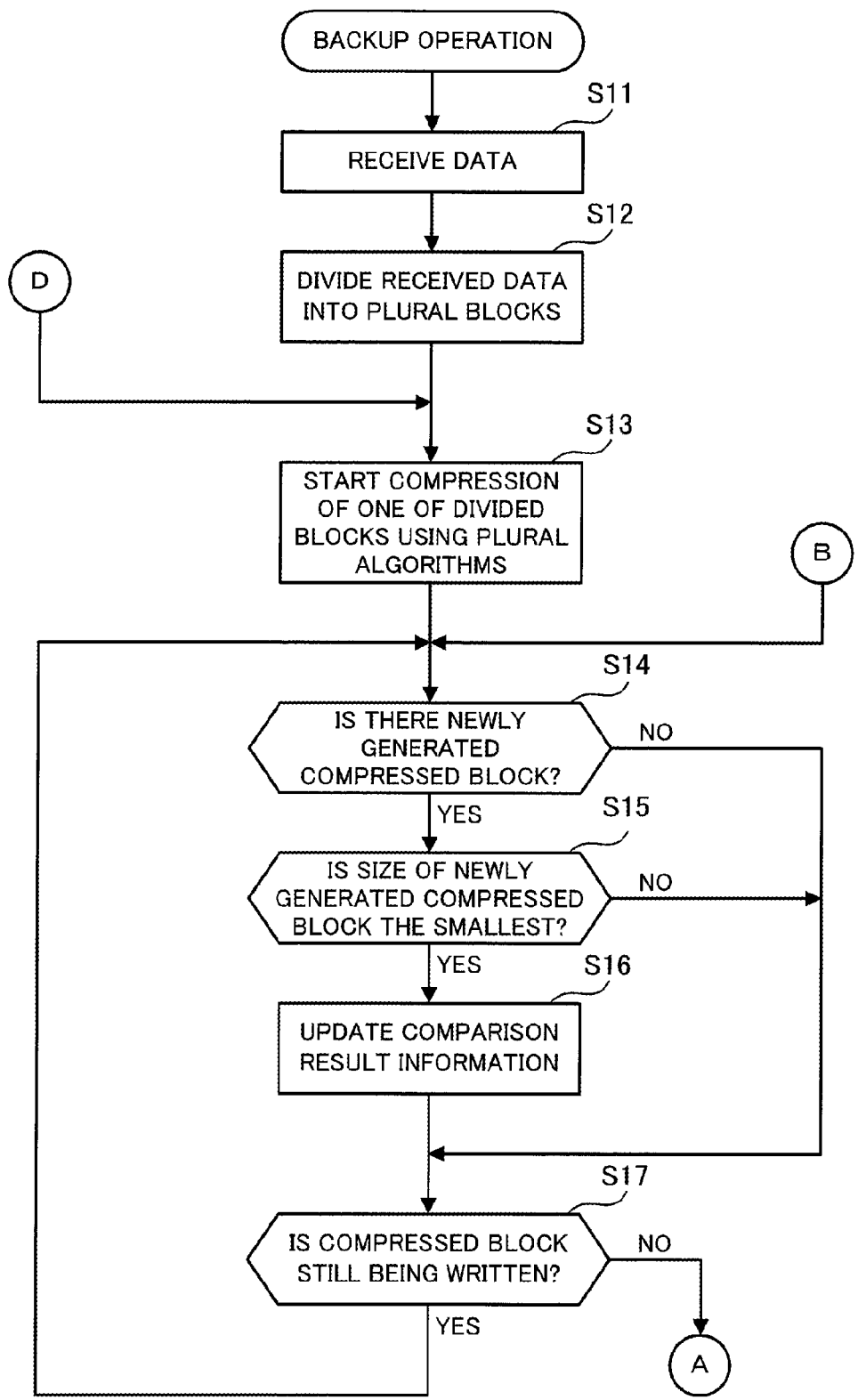
FIG. 9 is a flowchart illustrating the procedure of a backup operation according to the second embodiment.
Figure 10:
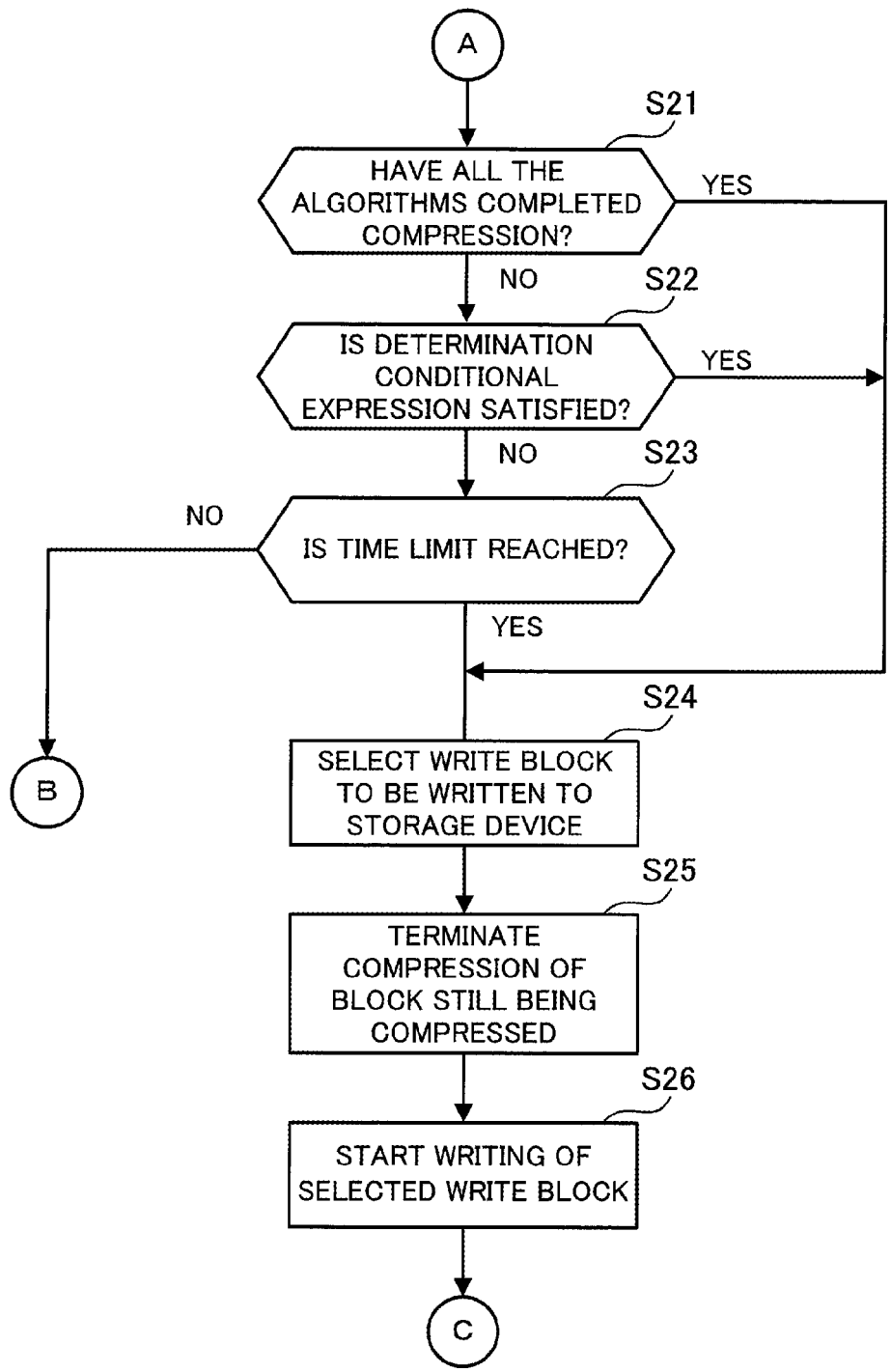
FIG. 10 is a flowchart illustrating the procedure of the backup operation according to the second embodiment.
Figure 11:
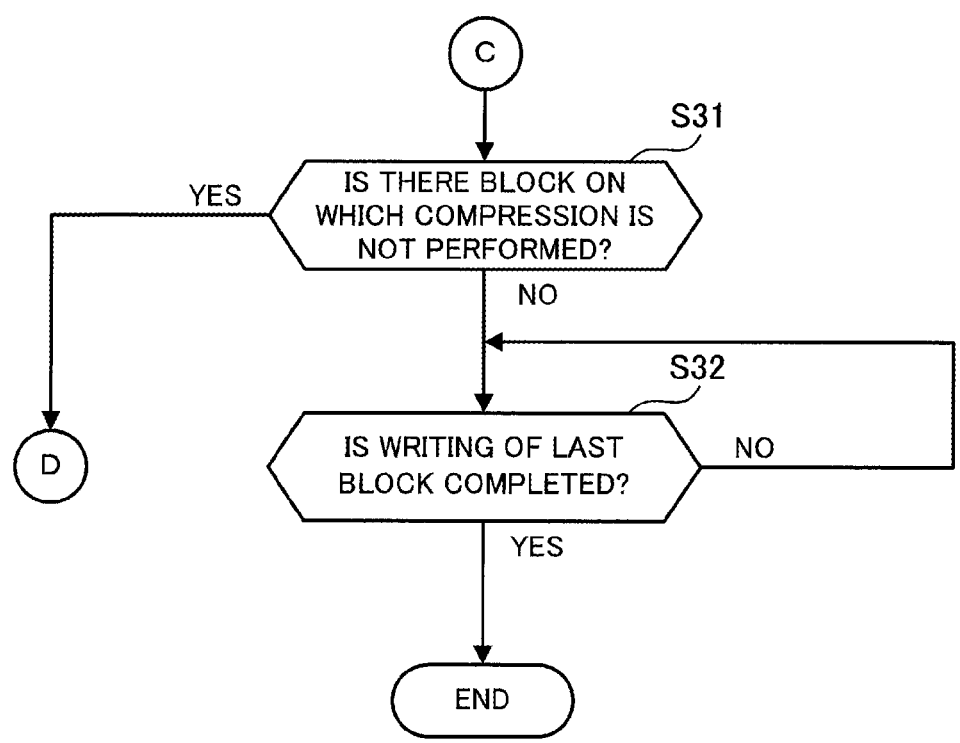
FIG. 11 is a flowchart illustrating the procedure of the backup operation according to the second embodiment.

FIGS. 9 through 11 are flowcharts illustrating the procedure of a backup operation according to the second embodiment. Upon receiving data transmitted from the host computer 300, the backup apparatus 100 of this embodiment divides the received data into a plurality of blocks, compresses and writes the blocks to the tape storage 120 on a per-block-basis, thereby backing up the data of the host computer 300. While in operation, the backup apparatus 100 of this embodiment performs a backup operation, and stands by for transmission of data from the host computer 300. In the following, the backup operation illustrated in FIGS. 9 through 11 will be described in order of step number indicated in the flowcharts.

(Step S11) The receiving unit 101 receives data transmitted from the host computer 300.

(Step S12) The dividing unit 102 divides the data received in Step S11 by the receiving unit 101 into a plurality of blocks of a predetermined size (e.g., 200 MB).

(Step S13) The compressing unit 103 starts compression of the blocks divided from the data in Step S12 using the respective algorithms of the algorithm executing units 103*a* through 103*d*. Note that the blocks are compressed one by one, starting with the first block. Compressed blocks generated by the respective algorithms are stored in the memory unit 104.

(Step S14) The comparing unit 105 determines whether any of the algorithm executing units 103*a* through 103*d* has newly generated a compressed block. If there is a newly generated compressed block (YES in Step S14), the process proceeds to Step S15. On the other hand, if there is no newly generated compressed block (NO in Step S14), the process proceeds to Step S17.

(Step S15) The comparing unit 105 compares the size of the newly generated compressed block that is detected in Step S14 with a compressed block size indicated in the comparison result information stored in the comparison result information storage unit 151 so as to determine whether the size of the newly generated compressed block is the smallest. In this way, the size of the newly generated compressed block is compared with the size of a compressed block having the smallest size among the already compressed blocks that are generated from the same block using different algorithms. If the size of the newly generated compressed block is the smallest (YES in Step S15), the process proceeds to Step S16. On the other hand, if the size of the newly generated compressed block is not the smallest (NO in Step S15), the process proceeds to Step S17.

(Step S16) The comparing unit 105 updates the comparison result information stored in the comparison result information storage unit 151 with comparison result information on the compressed block that is determined to have the smallest size in Step S15.

(Step S17) The comparing unit 105 determines whether a write block that is already compressed and is selected to be written to the tape storage 120 is still being written by the writing unit 107. If the write block is still being written by the writing unit 107 (YES in Step S17), the process proceeds to Step S14. On the other hand, if the write block is not being written by the writing unit 107 (NO in Step S17), the process proceeds to Step S21 (FIG. 10).

(Step S21) The writing start determining unit 106 determines whether all the algorithm executing units 103*a* through 103*d* have completed compression of the block selected in Step S13. If all the algorithm executing units 103*a* through 103*d* have completed compression (YES in Step S21), the process proceeds to Step S24. On the other hand, if any of the algorithm executing units 103*a* through 103*d* has not completed compression (NO in Step S21), the process proceeds to Step S22.

(Step S22) The writing start determining unit 106 determines whether the determination conditional expression is satisfied on the basis of the writing start determination information. If the determination conditional expression is satisfied (YES in Step S22), the process proceeds to Step S24. On the other hand, if the determination conditional expression is not satisfied (NO in Step S22), the process proceeds to Step S23.

Note that, since the first block of the data has no previous compressed block, the elapsed time for the previous block is "0", and therefore the determination conditional expression is not satisfied. Accordingly, determination for the first block of the data may be omitted.

(Step S23) The writing start determining unit 106 monitors, using a timer, the elapsed time from the start of block compression by the compressing unit 103, and determines whether the time limit indicated by the writing start determination information is reached. If the time limit is reached (YES in Step S23), the process proceeds to Step S24. On the other hand, if the time limit is not reached (NO in Step S23), the process proceeds to Step S14.

(Step S24) The writing start determining unit 106 refers to the comparison result information stored in the comparison result information storage unit 151, and selects the compressed block (or the uncompressed block) indicated in the comparison result information stored in the comparison result information storage unit 151 as a write block to be written to the tape storage 120.

(Step S25) If any of the blocks in the algorithm executing units 103*a* through 103*d* is still being compressed, the compressing unit 103 terminates the compression.

(Step S26) The writing unit 107 starts writing the write block selected in Step S24 to the tape storage 120. Then, the process proceeds to Step S31 (FIG. 11).

(Step S31) The comparing unit 105 determines whether there is a block on which compression is not performed, among the blocks divided from the received data 300*a*. If there is a block on which compression is not performed (YES in Step S31), the process proceeds to Step S13. On the other hand, if compression is performed on all the blocks (NO in Step S31), the process proceeds to Step S32.

(Step S32) The comparing unit 105 determines whether writing of a write block of the last block divided from the received data 300*a* by the writing unit 107 is completed. If writing of the last block is completed (YES in Step S32), the process ends. On the other hand, if writing of the last block is not completed (NO in Step S32), the operation of Step S32 is repeated.

FIGS. 12 through 18 are sequence diagrams illustrating the procedure of operations performed by the backup apparatus 100 according to the second embodiment. In the backup apparatus 100 of this embodiment, after the compression of the first block (block 1) divided from the data received from the host computer 300 is completed, compression by the compressing unit 103 and writing by the writing unit 107 are performed in parallel. In the following, operations performed after completion of compression of the block 1 in the backup apparatus 100 of this embodiment will be described with reference to FIGS. 12 through 18. For ease of explanation, in FIGS. 12 through 18, it is assumed that the compressing unit 103 includes two algorithm executing units 103*a* and 103*b*.

Figure 12:
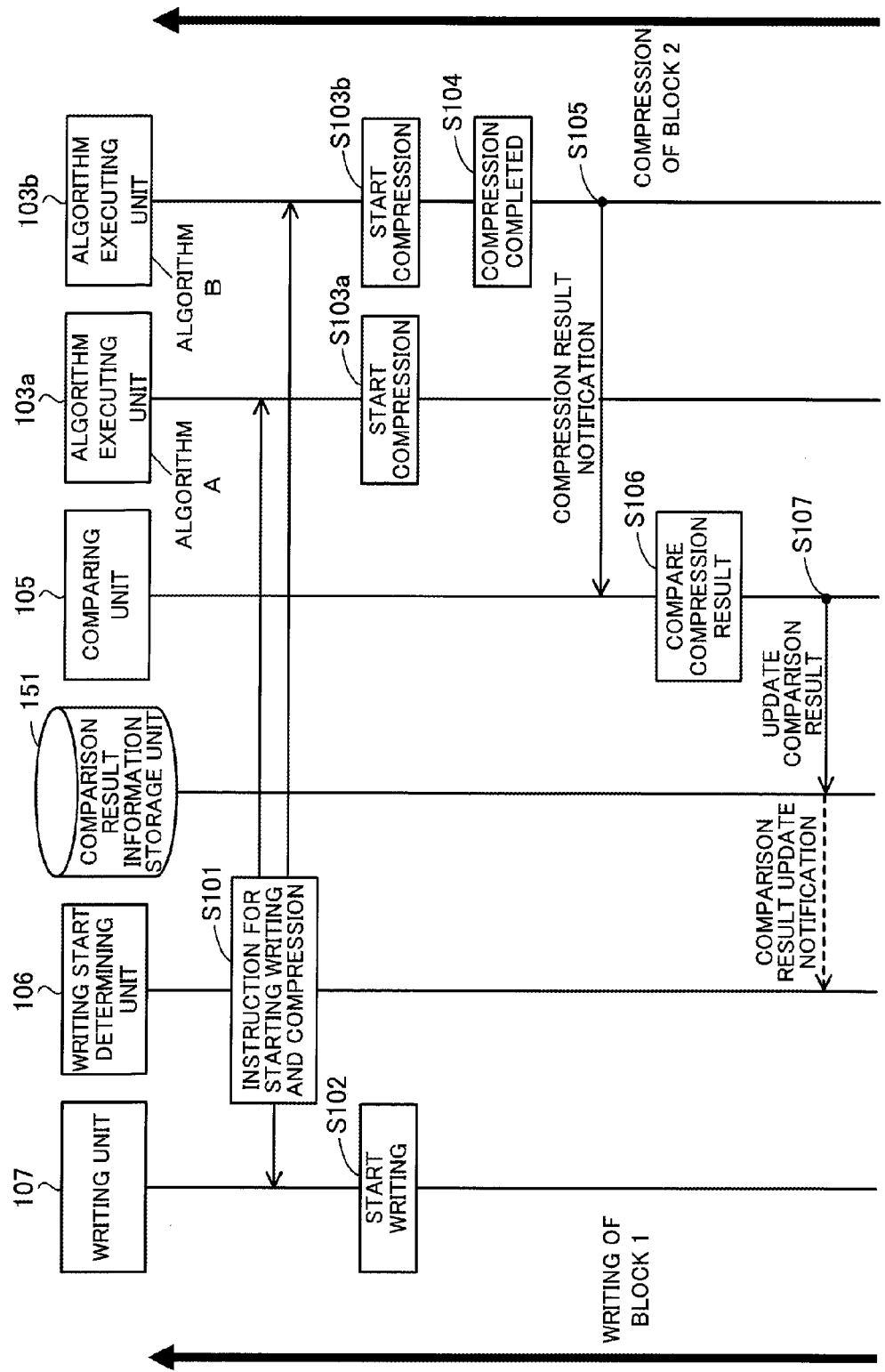
FIG. 12 is a sequence diagram illustrating the procedure of operations performed by the backup apparatus according to the second embodiment.
Figure 13:
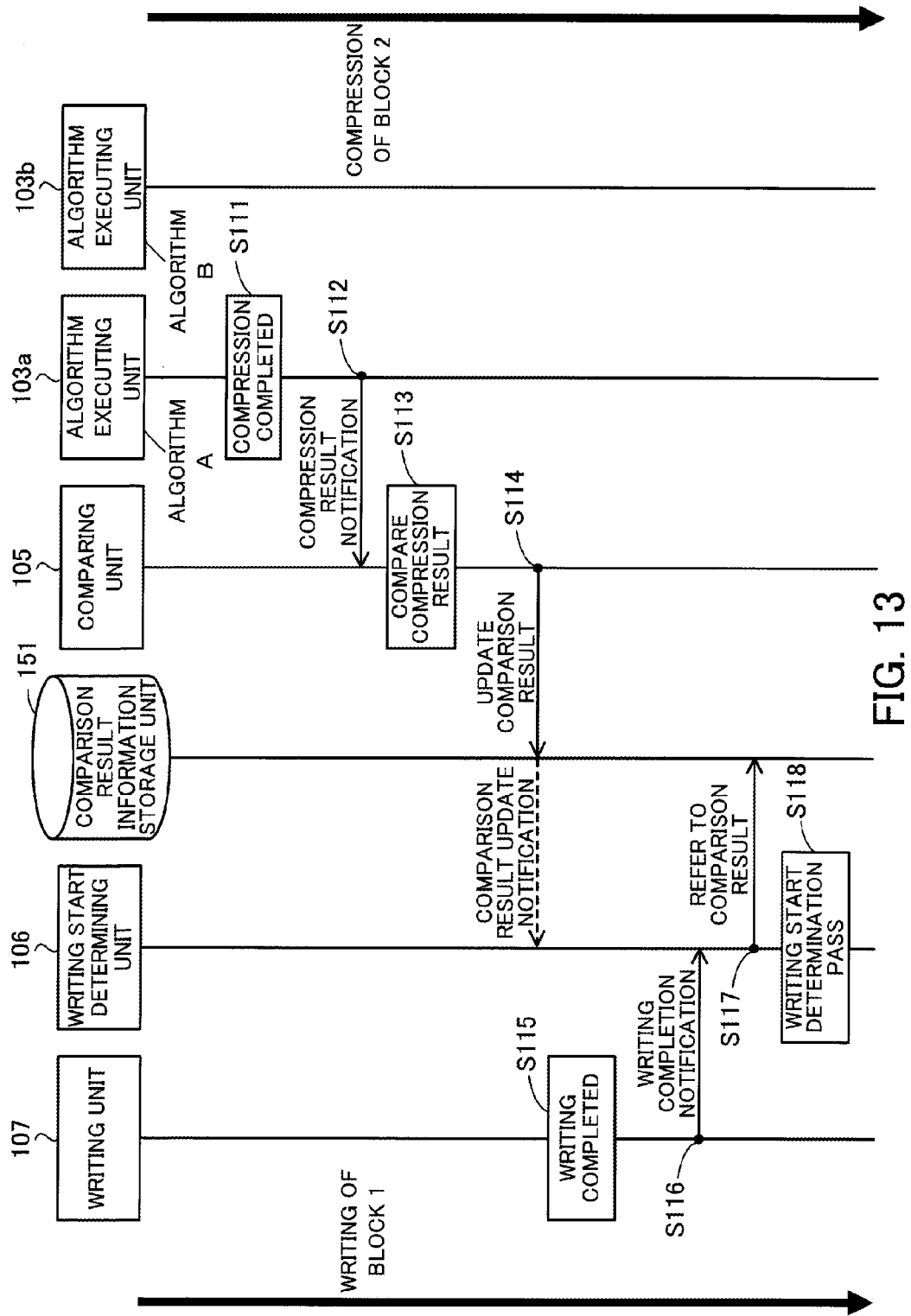
FIG. 13 is a sequence diagram illustrating the procedure of operations performed by the backup apparatus according to the second embodiment.

Steps S101 through S118 in FIGS. 12 and 13 illustrate the procedure of writing the first block (block 1) and compressing the second block (block 2). In the example illustrated in FIGS. 12 and 13, writing by the writing unit 107 is completed after compression by the algorithm executing units 103*a* and 103*b* (compression of the block 2) is completed.

(Step S101) When the compressing unit 103 completes compression of the block 1 and the writing start determining unit 106 makes a decision to start writing of the block 1 and compression of the block 2 in a writing start determination, the writing start determining unit 106 transmits a start instruction for writing of the block to the writing unit 107 and transmits a start instruction for compression of the block 2 to the algorithm executing units 103*a* and 103*b*.

(Step S102) Upon receiving the start instruction for writing of the block 1 transmitted in Step S101, the writing unit 107 starts writing to the tape storage 120 a write block of the block 1 corresponding to the comparison result information stored in the comparison result information storage unit 151.

(Step S103*a*) Upon receiving the start instruction for compression of the block 2 transmitted in Step S101, the algorithm executing unit 103*a* starts compression of the block 2 using the algorithm A.

(Step S103*b*) Upon receiving the start instruction for compression of the block 2 transmitted in Step S101, the algorithm executing unit 103*b* starts compression of the block 2 using the algorithm B. Note that Steps S102, S103*a*, and S103*b* are performed in parallel by the writing unit 107, the algorithm executing unit 103*a*, and the algorithm executing unit 103*b*, respectively.

(Step S104) In this example, the algorithm executing unit 103*b* completes the compression of the block 2, which is started in Step S103*b*.

(Step S105) When the compression is completed in Step S104, the algorithm executing unit 103*b* transmits a compression result notification to the comparing unit 105.

(Step S106) In response to the compression result notification transmitted in Step S105, the comparing unit 105 compares the size of the compressed block of the block 2 compressed with the algorithm B by the algorithm executing unit 103*b* with the size of the block (at this point, the block 2 that is not compressed) indicated in the comparison result information stored in the comparison result information storage unit 151. In this example, the size of the block compressed by the algorithm executing unit 103*b* is determined to be smaller on the basis of the results of the comparison by the comparing unit 105.

(Step S107) Since the size of the block compressed by the algorithm executing unit 103*b* is determined to be smaller on the basis of the results of the comparison in Step S106, the comparing unit 105 updates the comparison result information on the block 2 stored in the comparison result information storage unit 151 with comparison result information corresponding to the block compressed by the algorithm executing unit 103*b*. Further, the comparing unit 105 transmits to the writing start determining unit 106 a comparison result update notification notifying that the comparison result information is updated. Note that, since the writing of the block 1 is not completed at this point, the writing start determining unit 106 does not perform a writing start determination even though the comparison result update notification of Step S107 is received.

(Step S111) In this example, the algorithm executing unit 103*a* completes the compression of the block 2, which is started in Step S103*a*.

(Step S112) When the compression is completed in Step S111, the algorithm executing unit 103*a* transmits a compression result notification to the comparing unit 105.

(Step S113) In response to the compression result notification transmitted in Step S112, the comparing unit 105 compares the size of the compressed block of the block 2 compressed with the algorithm A by the algorithm executing unit 103*a* with the size of the block (at this point, the compressed block of the block 2 that is compressed by the algorithm executing unit 103*b*) indicated in the comparison result information stored in the comparison result information storage unit 151. In this example, the size of the block compressed by the algorithm executing unit 103*a* is determined to be smaller on the basis of the results of the comparison by the comparing unit 105.

(Step S114) Since the size of the block compressed by the algorithm executing unit 103*a* is determined to be smaller on the basis of the results of the comparison in Step S113, the comparing unit 105 updates the comparison result information on the block 2 stored in the comparison result information storage unit 151 with comparison result information corresponding to the block compressed by the algorithm executing unit 103*a*. Further, the comparing unit 105 transmits to the writing start determining unit 106 a comparison result update notification notifying that the comparison result information is updated. Note that, since the writing of the block 1 is not completed at this point, the writing start determining unit 106 does not perform a writing start determination even though the comparison result update notification of Step S114 is received.

(Step S115) In this example, the writing unit 107 completes the writing of the write block of the block 1, which is started in Step S102.

(Step S116) Since the writing is completed in Step S115, the writing unit 107 transmits a writing completion notification to the writing start determining unit 106.

(Step S117) Upon receiving the writing completion notification transmitted in Step S116, the writing start determining unit 106 refers to the comparison result information in the comparison result information storage unit 151 indicating the compressed block of the block 2 which is compressed by the algorithm executing unit 103*a*.

(Step S118) In this example, the writing start determining unit 106 determines that the determination conditional expression is determined to be satisfied from the results of a writing start determination based on the comparison result information referred to in Step S117, and determines to start writing of the block 2 and compression of the block 3 following the block 2. In this way, writing of the block 1 and compression of the block 2 are completed, and writing of the block 2 and compression of the block 3 are started as described below.

Figure 14:
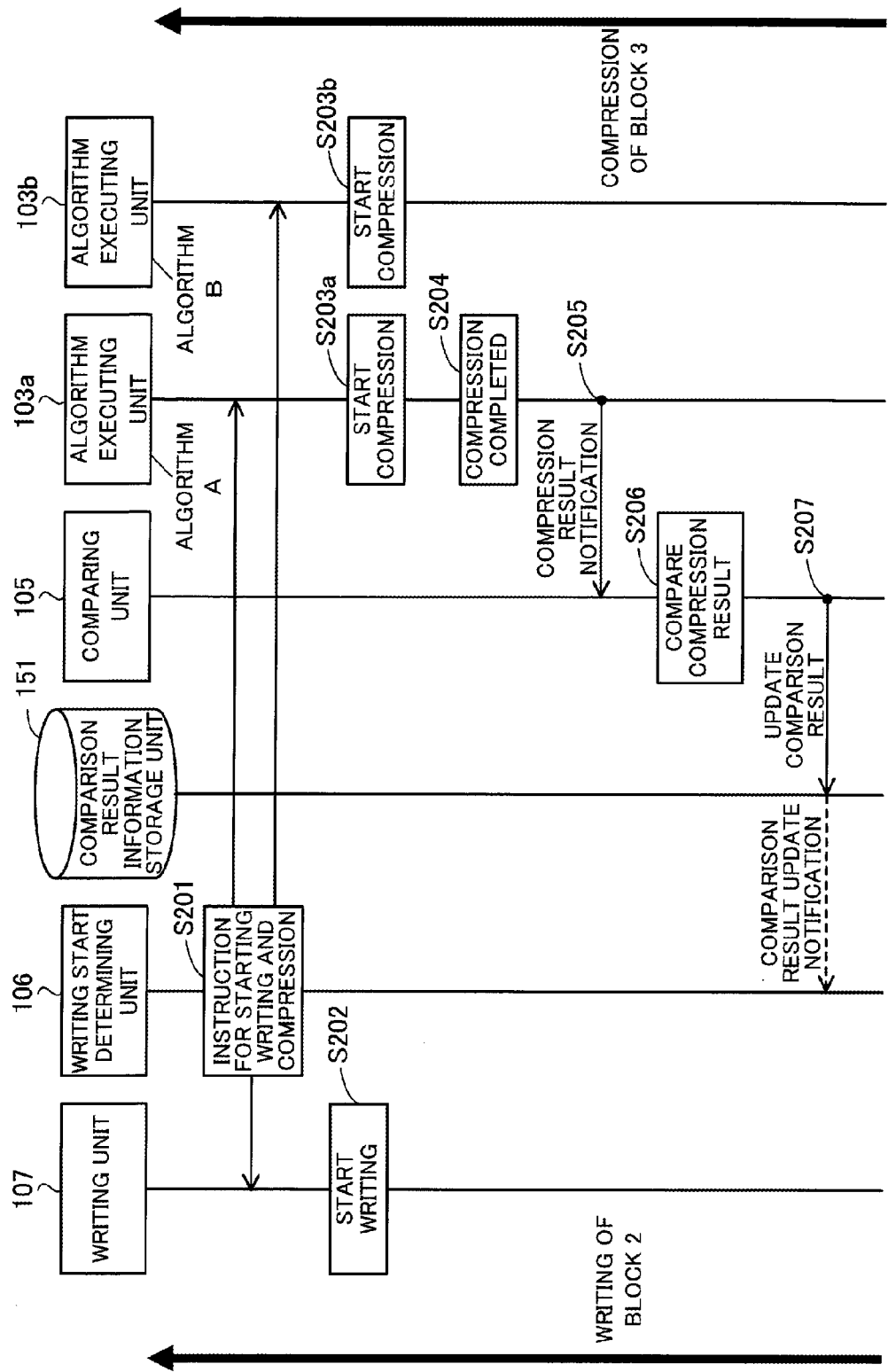
FIG. 14 is a sequence diagram illustrating the procedure of operations performed by the backup apparatus according to the second embodiment.
Figure 15:
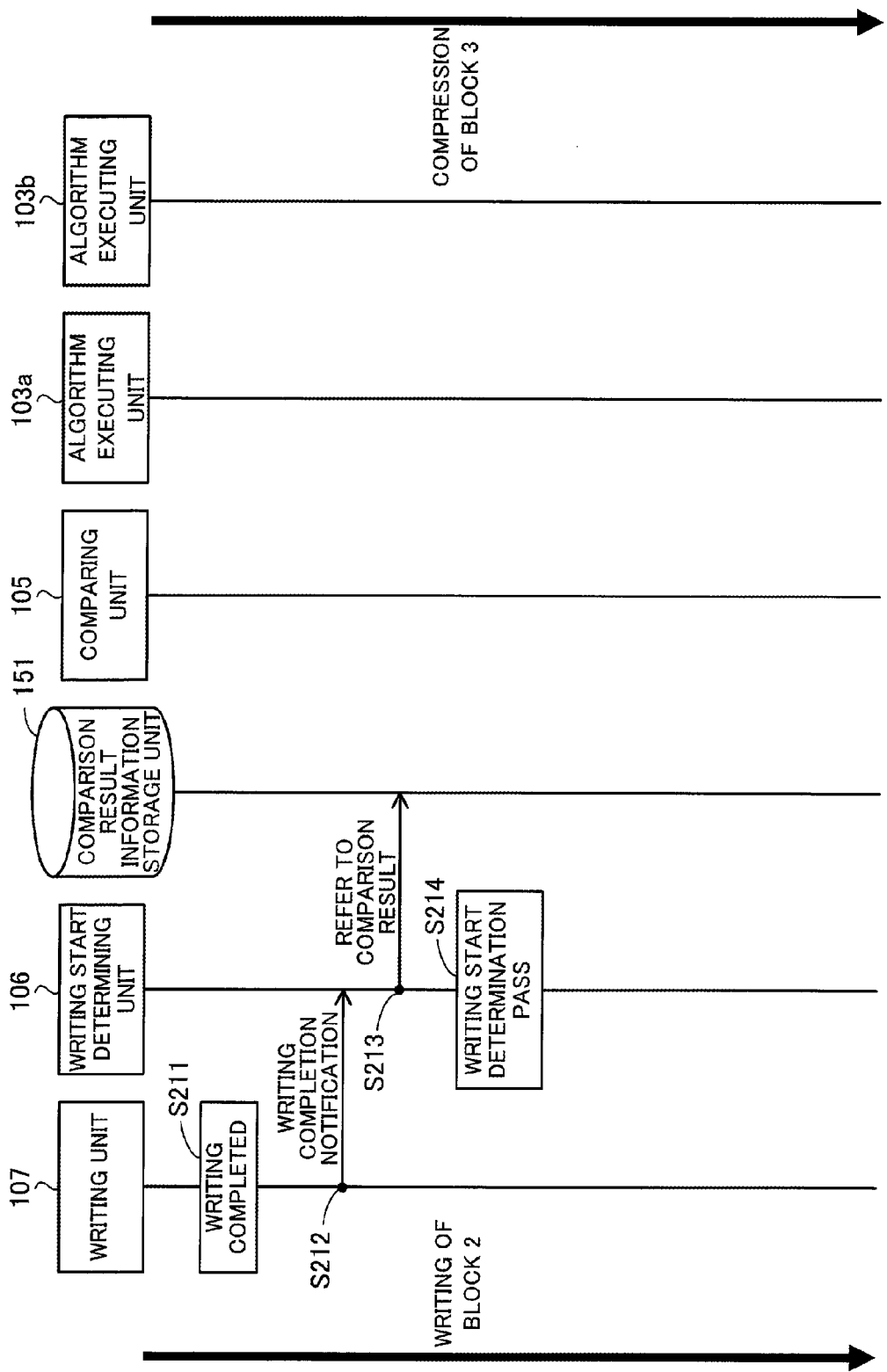
FIG. 15 is a sequence diagram illustrating the procedure of operations performed by the backup apparatus according to the second embodiment.

Steps S201 through S214 in FIGS. 14 and 15 illustrate the procedure of writing the block 2 and compressing the third block (block 3). In the example illustrated in FIGS. 14 and 15, before compression by the algorithm executing unit 103b is completed, the determination conditional expression is satisfied in compression by the algorithm executing unit 103a, and a start decision is made in a writing start determination.

(Step S201) When the writing start determining unit 106 makes a decision to start writing of the block 2 and compression of the block 3 in the writing start determination of Step S118, the writing start determining unit 106 transmits a start instruction for writing of the block 2 to the writing unit 107 and transmits a start instruction for compression of the block 3 to the algorithm executing units 103a and 103b.

(Step S202) Upon receiving the start instruction for writing of the block 2 transmitted in Step S201, the writing unit 107 starts writing to the tape storage 120 a write block of the block 2 corresponding to the comparison result information stored in the comparison result information storage unit 151.

(Step S203a) Upon receiving the start instruction for compression of the block 3 transmitted in Step S201, the algorithm executing unit 103a starts compression of the block 3 using the algorithm A.

(Step S203b) Upon receiving the start instruction for compression of the block 3 transmitted in Step S201, the algorithm executing unit 103b starts compression of the block 3 using the algorithm B. Note that Steps S202, S203a, and S203b are performed in parallel by the writing unit 107, the algorithm executing unit 103a, and the algorithm executing unit 103b, respectively.

(Step S204) In this example, the algorithm executing unit 103a completes the compression of the block 3, which is started in Step S203a.

(Step S205) When the compression is completed in Step S204, the algorithm executing unit 103a transmits a compression result notification to the comparing unit 105.

(Step S206) In response to the compression result notification transmitted in Step S205, the comparing unit 105 compares the size of the compressed block of the block 3 compressed with the algorithm A by the algorithm executing unit 103a with the size of the block (at this point, the block 3 that is not compressed) indicated in the comparison result information stored in the comparison result information storage unit 151. In this example, the size of the block compressed by the algorithm executing unit 103a is determined to be smaller on the basis of the results of the comparison by the comparing unit 105.

(Step S207) Since the size of the block compressed by the algorithm executing unit 103a is determined to be smaller on the basis of the results of the comparison in Step S206, the comparing unit 105 updates the comparison result information on the block 3 stored in the comparison result information storage unit 151 with comparison result information corresponding to the block compressed by the algorithm executing unit 103a. Further, the comparing unit 105 transmits to the writing start determining unit 106 a comparison result update notification notifying that the comparison result information is updated.

(Step S211) In this example, the writing unit 107 completes the writing of the write block of the block 2, which is started in Step S202.

(Step S212) Since the writing is completed in Step S211, the writing unit 107 transmits a writing completion notification to the writing start determining unit 106.

(Step S213) Upon receiving the writing completion notification transmitted in Step S212, the writing start determining unit 106 refers to the comparison result information in the comparison result information storage unit 151 indicating the compressed block of the block 3 which is compressed by the algorithm executing unit 103a.

(Step S214) In this example, the writing start determining unit 106 determines that the determination conditional expression is determined to be satisfied from the results of a writing start determination based on the comparison result information referred to in Step S213, and determines to start writing of the block 3 and compression of a block 4 following the block 3. Thus, the writing of the block 2 and the compression of the block 3 are completed. Note that, in Step S214, the decision to start writing of the block 3 and compression of the block 4 is made before the compression of the block 3 by the algorithm executing unit 103b is completed. Therefore, the algorithm executing unit 103b terminates compression of the block 3 as described below. Subsequently, writing of the block 3 and compression of the block 4 are started as described below.

Figure 16:
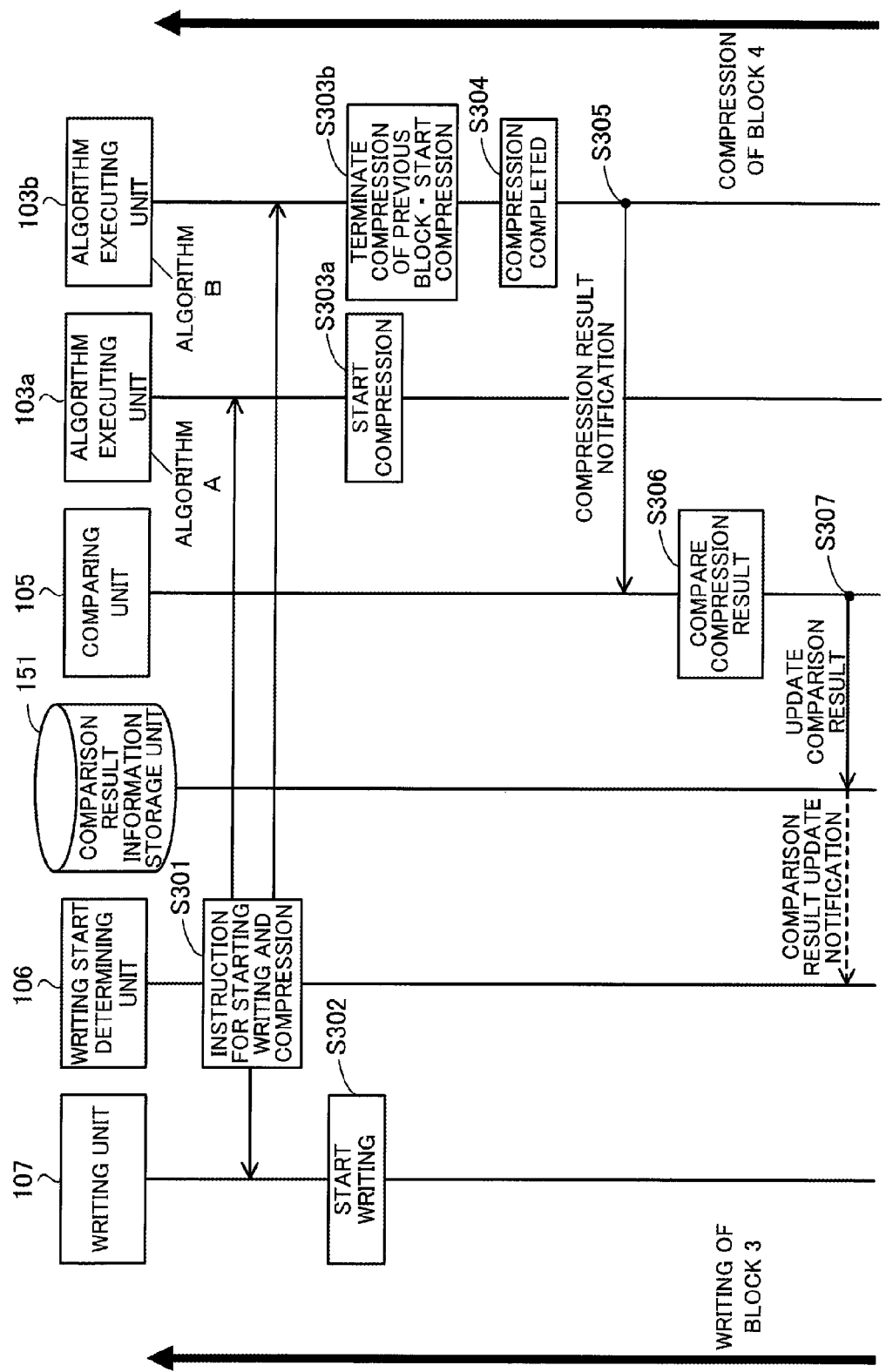
FIG. 16 is a sequence diagram illustrating the procedure of operations performed by the backup apparatus according to the second embodiment.
Figure 17:
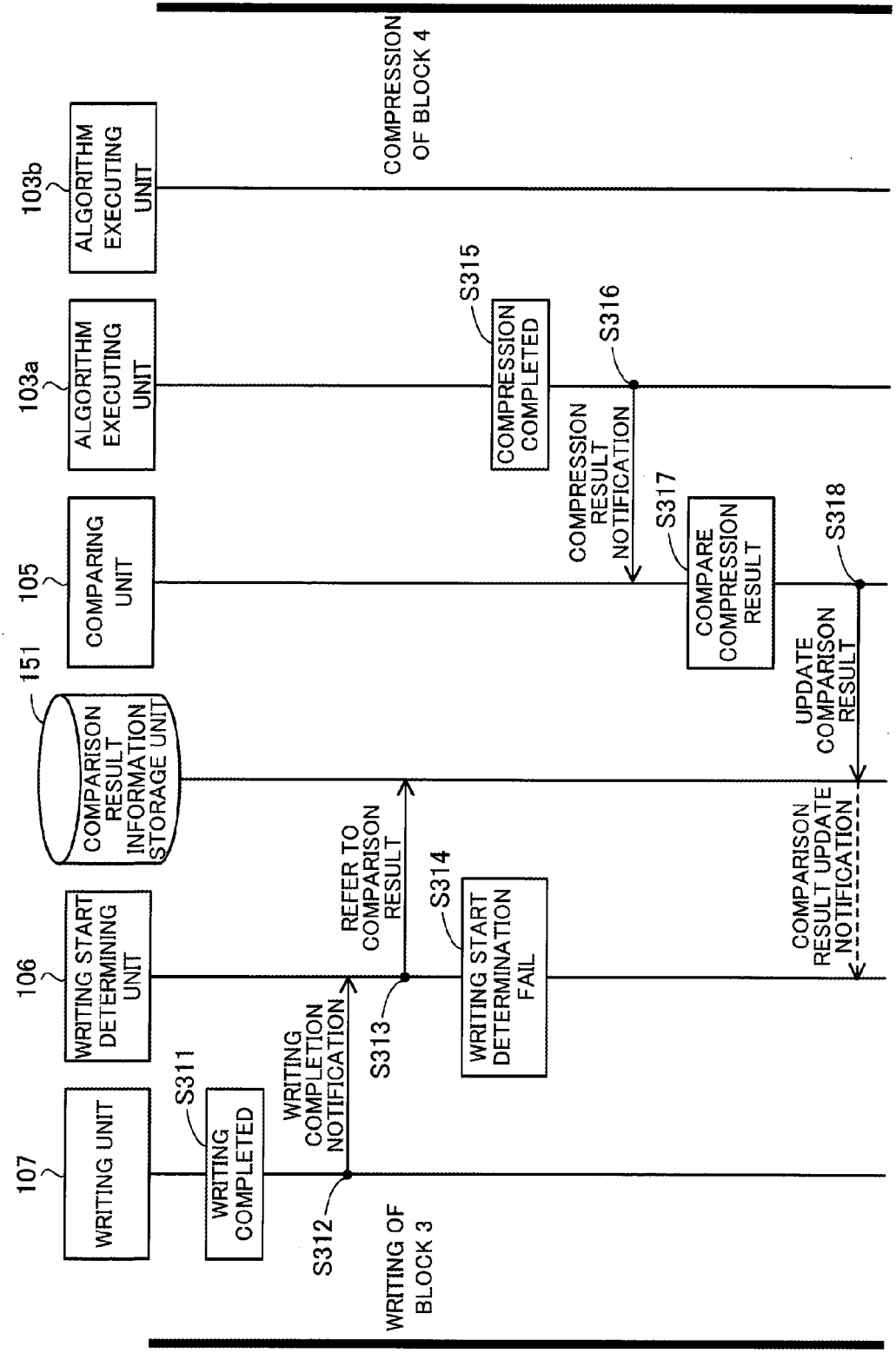
FIG. 17 is a sequence diagram illustrating the procedure of operations performed by the backup apparatus according to the second embodiment.
Figure 18:
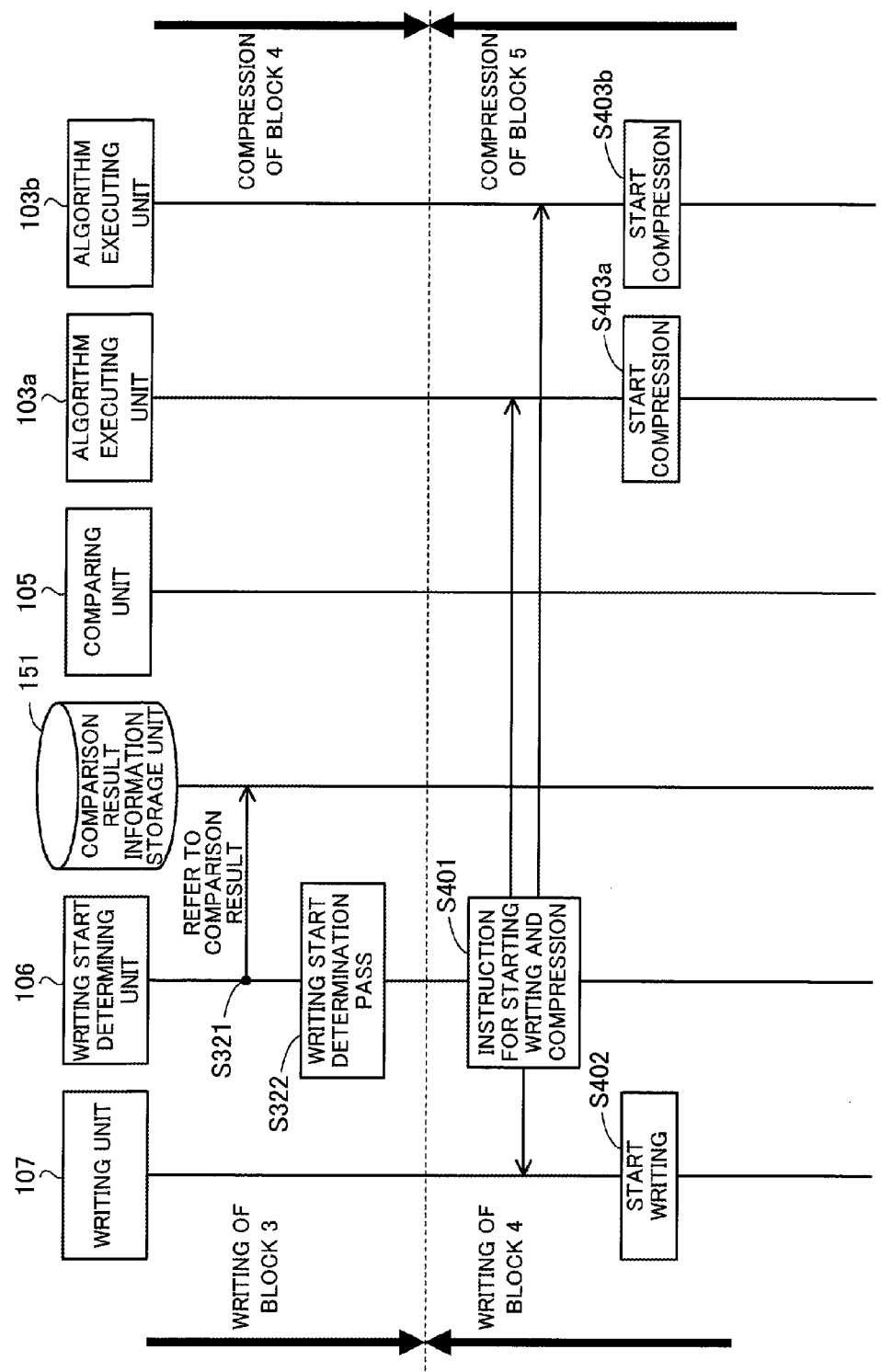
FIG. 18 is a sequence diagram illustrating the procedure of operations performed by the backup apparatus according to the second embodiment.

Step S301 in FIG. 16 through Step S322 in the first half of FIG. 18 illustrate the procedure of writing the block 3 and compressing the fourth block (block 4). In the example illustrated in FIG. 16 through the first half of FIG. 18, the determination conditional expression is not satisfied in a writing start determination at the time of completion of compression by the algorithm executing unit 103b and, the determination conditional expression is satisfied with respect to compression by the algorithm executing unit 103a, a start decision is made in a writing start determination. Step S401 through Steps S403a and S403b in the second half of FIG. 18 illustrate the procedure of writing the block 4 and compressing the fifth block (block 5). In the example illustrated in the second half of FIG. 18, writing of the block 4 and compression of the block 5 are started in response to a completion of the operations of FIG. 16 through the first half of FIG. 18.

(Step S301) When the compressing unit 103 completes the compression of the block 3 and the writing start determining unit 106 makes a decision to start writing of the block 3 and compression of the block 4 in a writing start determination, the writing start determining unit 106 transmits a start instruction for writing of the block 3 to the writing unit 107 and transmits a start instruction for compression of the block 4 to the algorithm executing units 103a and 103b.

(Step S302) Upon receiving the start instruction for writing of the block 3 transmitted in Step S301, the writing unit 107 starts writing to the tape storage 120 a write block of the block 3 indicated in the comparison result information stored in the comparison result information storage unit 151.

(Step S303a) Upon receiving the start instruction for compression of the block 4 transmitted in Step S301, the algorithm executing unit 103a starts compression of the block 4 using the algorithm A.

(Step S303b) Upon receiving the start instruction for compression of the block 4 transmitted in Step S301, the algorithm executing unit 103b terminates compression of the block 3 with the algorithm B that is not completed, and starts compression of the block 4 using the algorithm B. Note that Steps S302, S303a, and S303b are performed in parallel by the writing unit 107, the algorithm executing unit 103a, and the algorithm executing unit 103b, respectively.

(Step S304) In this example, the algorithm executing unit 103b completes the compression of the block 4, which is started in Step S303b.

(Step S305) When the compression is completed in Step S304, the algorithm executing unit 103b transmits a compression result notification to the comparing unit 105.

(Step S306) In response to the compression result notification transmitted in Step S305, the comparing unit 105 compares the size of the compressed block of the block 4 compressed with the algorithm B by the algorithm executing unit 103b with the size of the block (at this point, the block 4 that is not compressed) indicated in the comparison result information stored in the comparison result information storage unit 151. In this example, the size of the block compressed by the algorithm executing unit 103b is determined to be smaller on the basis of the results of the comparison by the comparing unit 105.

(Step S307) Since the size of the block compressed by the algorithm executing unit 103b is determined to be smaller on the basis of the results of the comparison in Step S306, the comparing unit 105 updates the comparison result information on the block 4 stored in the comparison result information storage unit 151 with comparison result information indicating the block compressed by the algorithm executing unit 103b. Further, the comparing unit 105 transmits to the writing start determining unit 106 a comparison result update notification notifying that the comparison result information is updated. Note that, since the writing of the block 3 is not completed at this point, the writing start determining unit 106 does not perform a writing start determination even though the comparison result update notification of Step S307 is received.

(Step S311) In this example, the writing unit 107 completes the writing of the write block of the block 3, which is started in Step S302.

(Step S312) Since the writing is completed in Step S311, the writing unit 107 transmits a writing completion notification to the writing start determining unit 106.

(Step S313) Upon receiving the writing completion notification transmitted in Step S312, the writing start determining unit 106 refers to the comparison result information in the comparison result information storage unit 151 indicating the compressed block of the block 4 which is compressed by the algorithm executing unit 103b. In this example, in Step S313, the size of the block compressed by the algorithm executing unit 103b is relatively great, and therefore the determination conditional expression is not satisfied with respect to compression by the algorithm executing unit 103b.

(Step S314) In this example, since the determination conditional expression is determined not to be satisfied from the results of a writing start determination based on the comparison result information referred to in Step S313, the writing start determining unit 106 determines not to start writing of the block 4 and compression of the block 5.

(Step S315) In this example, the algorithm executing unit 103a completes the compression of the block 4, which is started in Step S303a.

(Step S316) When the compression is completed in Step S315, the algorithm executing unit 103a transmits a compression result notification to the comparing unit 105.

(Step S317) In response to the compression result notification transmitted in Step S316, the comparing unit 105 compares the size of the compressed block of the block 4 compressed with the algorithm A by the algorithm executing unit 103a with the size of the block (at this point, the compressed block of the block 4 that is compressed by the algorithm executing unit 103b) indicated in the comparison result information stored in the comparison result information storage unit 151. In this example, the size of the block compressed by the algorithm executing unit 103a is determined to be smaller on the basis of the results of the comparison by the comparing unit 105.

(Step S318) Since the size of the block compressed by the algorithm executing unit 103a is determined to be smaller on the basis of the results of the comparison in Step S317, the comparing unit 105 updates the comparison result information on the block 4 stored in the comparison result information storage unit 151 with comparison result information indicating the block compressed by the algorithm executing unit 103a. Further, the comparing unit 105 transmits to the writing start determining unit 106 a comparison result update notification notifying that the comparison result information is updated.

(Step S321) Upon receiving the comparison result notification transmitted in Step S318, the writing start determining unit 106, which has already received the writing completion notification in Step S312, refers to the comparison result information in the comparison result information storage unit 151 indicating the compressed block of the block 4 which is compressed by the algorithm executing unit 103a. In this example, in Step S321, the size of the block compressed by the algorithm executing unit 103a is sufficiently small, and therefore the determination conditional expression is satisfied with respect to compression by the algorithm executing unit 103a.

(Step S322) Since the determination conditional expression is determined to be satisfied from the results of a writing start determination based on the comparison result information referred to in Step S321, the writing start determining unit 106 determines to start writing of the block 4 and compression of the block 5. In this way, writing of the block 3 and compression of the block 4 are completed, and writing of the block 4 and compression of the block 5 are started as described below.

(Step S401) When the compressing unit 103 completes the compression of the block 4 and the writing start determining unit 106 makes a decision to start writing of the block 4 and compression of the block 5 in a writing start determination, the writing start determining unit 106 transmits a start instruction for writing of the block 4 to the writing unit 107 and transmits a start instruction for compression of the block 5 to the algorithm executing units 103a and 103b.

(Step S402) Upon receiving the start instruction for writing of the block 4 transmitted in Step S401, the writing unit 107 starts writing to the tape storage 120 a write block of the block 4 indicated in the comparison result information stored in the comparison result information storage unit 151.

(Step S403a) Upon receiving the start instruction for compression of the block 5 transmitted in Step S401, the algorithm executing unit 103a starts compression of the block 5 using the algorithm A.

(Step S403b) Upon receiving the start instruction for compression of the block 5 transmitted in Step S401, the algorithm executing unit 103b starts compression of the block 5 using the algorithm B. Note that Steps S402, S403a, and S403b are performed in parallel by the writing unit 107, the algorithm executing unit 103a, and the algorithm executing unit 103b, respectively.

In the following, Example and Comparative Example of the backup apparatus 100 of this embodiment will be described with reference to FIGS. 19 through 24.

FIG. 19 illustrates setting conditions for Example of the second embodiment and Comparative Example. In the following description, it is assumed that Example and Comparative Example are operated under the setting conditions illustrated in FIG. 19.

In FIG. 19, the "data size" indicates, in megabytes, the size of the data 300a that is transmitted from the host computer 300 and is to be backed up in each of Example and Comparative Example. In this example, for instance, the data size is set to 1,000 MB.

The "divided block size" indicates, in megabytes, the size of blocks 300b into which the data 300a transmitted from the host computer 300 is divided in each of Example and Comparative Example. In this example, for instance, the block size is set to 200 MB.

The "writing speed" indicates, in MB/s, the speed of writing compressed blocks 300c of the respective divided blocks 300b to a storage medium such as the tape storage 120 in Each of Example and Comparative Example. In this example, for instance, the writing speed is set to 20 MB/s.

The "time limit" indicates, in seconds, the time limit for terminating compression of a block even if not all the algorithms have completed compression of the block, and starting writing of a write block and compression of the next block. In this example, for instance, the time limit is set to 15 seconds.

FIG. 20 illustrates execution results of Example of the second embodiment. In FIG. 20, the execution results of Example of the backup apparatus 100 of this embodiment under the setting conditions of FIG. 19 are illustrated.

The "compressed block" indicates to which block the results of compression by the compressing unit 103 are related. For example, "1" indicates that the compression results are related to the first divided block (i.e., block 1) of the data 300a. In this example, as illustrated in the setting conditions of FIG. 19, since the data size of the data 300a is 1,000 MB, and the divided block size is 200 MB, the data 300a is divided into five blocks. Further, the "writing" in the second row from the bottom indicates the results of writing of a write block of the last divided block (i.e., block 5). Further, the "total" in the last row indicates the total value of each element.

The "compression time" indicates, in seconds, the time taken to complete compression of each block by the algorithms executed in the respective algorithm executing units 103a through 103d of the compressing unit 103. The underlined elements indicate that blocks compressed by the corresponding algorithms are selected as write blocks to be written. Further, the elements in parentheses indicate that compression operations using the corresponding algorithms are terminated in accordance with a writing start determination by the writing start determining unit 106. Although compression operations are not completed in Example, these elements are illustrated for explanation purposes.

The "compressed block size" indicates, in megabytes, the size of a compressed block of each block compressed by the algorithms executed in the respective algorithm executing units 103a through 103d of the compressing unit 103. As in the case of the "compression time" item, the underlined elements indicate that blocks compressed by the corresponding algorithms are selected as write blocks to be written. Further, the elements in parentheses indicate that compression operations using the corresponding algorithms are terminated in accordance with a writing start determination by the writing start determining unit 106. Although compression operations are not completed in Example, these elements are illustrated for explanation purposes. Further, as for the "compressed block size", the "uncompressed" is provided that indicates the size of the block that is not compressed by the compressing unit 103. In some cases, the uncompressed block may be written by the backup apparatus 100 of this embodiment.

The "elapsed time" indicates, in seconds, the time take from when compression by the compressing unit 103 and writing by the writing unit 107 (as for the step of compression of the block 1, compression only) are started to when a write block to be written is selected by the writing start determining unit 106.

The "write block size" indicates, in megabytes, the size of the compressed block which is selected by the writing start determining unit 106 as a write block.

FIGS. 21A through 21C and FIGS. 22A through 22C illustrate the processing results of blocks according to the second embodiment. In the following, the compression results of the blocks 1 through 5 in Example of the second embodiment of FIG. 20 will be described with reference to FIGS. 21A through 21C and FIGS. 22A through 22C. FIG. 21A illustrates the compression result of the block 1. FIG. 21B illustrates the compression result of the block 2. FIG. 21C illustrates the compression result of the block 3. FIG. 22A illustrates the compression result of the block 4. FIG. 22B illustrates the compression result of the block 5. FIG. 22C illustrates the compression result of the block 5.

In FIGS. 21A through 21C and FIGS. 22A through 22C, the "selected algorithm" indicates the algorithm with which the compressed block selected as a write block to be written to the tape storage 120 is compressed, on the basis of the results of compression of a block in the backup apparatus 100. Note that if the uncompressed block is selected as a write block, "uncompressed" is indicated in the "the selected algorithm".

The "write block size" indicates, in megabytes, the size of the compressed block selected as a write block to be written to the tape storage 120, on the basis of the results of compression of the block in the backup apparatus 100.

The "elapsed time" indicates, in seconds, the time taken from when compression of the block in the backup apparatus 100 is started to when writing of the write block of the block is started in accordance with a determination by the writing start determining unit 106.

In Example of this embodiment, the block 1 illustrated in FIG. 21A is the first block of the data 300a that is compressed by the backup apparatus 100. That is, there is no previous block to be compressed, and the elapsed time in the previous block is "0". Therefore, the right-hand side of the determination conditional expression (1) is "0", so that the determination conditional expression (size of the smallest compressed block of the block 1/writing speed (20 MB)≦0) is not satisfied. Accordingly, as illustrated in the "compression time" in FIG. 20, the writing start determining unit 106 determines to start writing of the block 1 at the time when the algorithm C with the greatest processing time is completed after a lapse of 11 seconds from when compression of the block 1 is started. Thus, the elapsed time of Step 1 is 11 seconds. At this point, the writing unit 107 selects, as a write block, the compressed block (80 MB) with the smallest size which is compressed by the algorithm C and is indicated in the comparison result information stored in the comparison result information storage unit 151, among the compressed blocks of the block 1 generated by the algorithms A through D and the uncompressed block 1 (see FIG. 20), and writes the selected block compressed with the algorithm C to the tape storage 120 in the next step.

Subsequently, in Example of this embodiment, compression of the block 2 and writing of the write block of the block 1 illustrated in FIG. 21B are performed. In this example, since the writing speed is 20 MB/s, the writing unit 107 completes the writing of the block 1 of 80 MB after a lapse of 4 seconds from when compression of the block 2 is started and, at this point, the writing start determining unit 106 determines to start writing of the block 2. In this case, since the elapsed time for compression of the block 1 is "11", the right-hand side of the determination conditional expression (1) is "11". Further, when 4 seconds are elapsed from when compression of the block 2 is started, as illustrated in FIG. 20, none of the algorithms A through D have not completed compression of the block 2, comparison result information on the uncompressed block 2 is stored in the comparison result information storage unit 151. Accordingly, upon completion of the writing of the write block of the block 1, the determination conditional expression (size of the smallest compressed block of the block 2 (200 MB)/writing speed (20 MB)=10≦11) is satisfied. Therefore, compression of the block 2 is determined to be completed, and the uncompressed block 2 is selected as a write block of the block 2. Further, the writing start determining unit 106 determines to start writing of the blocks 2 when writing of the block 1 is completed. Further, the elapsed time for the block 2 is 4 seconds, which is the time taken to write the write block of the block 1. At this point, the writing unit 107 selects, as a write block, the uncompressed block (200 MB) indicated in the comparison result information stored in the comparison result information storage unit 151, and writes the selected uncompressed block to the tape storage 120 in the next step.

Subsequently, in Example of this embodiment, compression of the block 3 and writing of the write block of the block 2 illustrated in FIG. 21C are performed. In this example, the writing unit 107 completes the writing of the block 2 of 200 MB after a lapse of 10 seconds from when compression of the block 3 is started, and the writing start determining unit 106 determines to start writing of the block 3. In this case, since the elapsed time for the block 2 is "4", the right-hand side of the determination conditional expression (1) is "4". Further, when 10 seconds are elapsed from when compression of the block 3 is started, as illustrated in FIG. 20, comparison result information on the compressed block of the block 3 generated by the algorithm A is stored in the comparison result information storage unit 151. Accordingly, upon completion of the writing of the write block of the block 2, the determination conditional expression (size of the smallest compressed block of the block 3 (162 MB)/writing speed (20 MB)=8.1>4) is not satisfied.

After that, in the example of FIG. 20, the block compressed by the algorithm A remains to be the smallest until the time limit (i.e., 15 seconds) is reached, and the conditional expression for determining whether to start writing is not satisfied. Accordingly, the writing start determining unit 106 determines to start writing of the block 3 when the time limit elapses. Thus, the elapsed time of Step 3 is 15 seconds. When the time limit elapses, the writing unit 107 selects, as a write block, the compressed block (162 MB) of the block 3 which is compressed by the algorithm A and is indicated in the comparison result information stored in the comparison result information storage unit 151, and writes the selected block compressed by the algorithm A to the tape storage 120 in the next step.

Subsequently, in Example of this embodiment, compression of the block 4 and writing of the write block of the block 3 illustrated in FIG. 22A are performed. In this example, the writing unit 107 completes the writing of the block 3 of 162 MB after a lapse of 8.1 seconds from when compression of the block 4 is started, and the writing start determining unit 106 performs a writing start determination for the block 4. In this case, since the elapsed time for the block 3 is "15", the right-hand side of the determination conditional expression (1) is "15". Further, when 8.1 seconds are elapsed from when compression of the block 4 is started, as illustrated in FIG. 20, comparison result information on the compressed block of the block 4 generated by the algorithm C is stored in the comparison result information storage unit 151. Accordingly, upon completion of the writing of the write block of the block 3, the determination conditional expression (size of the smallest compressed block of the block 4 (190 MB)/writing speed (20 MB)=9.5≦15) is satisfied. Therefore, compression of the block 4 is determined to be completed, and the compressed block of the block 4 generated by the algorithm C is selected as a write block of the block 4. Further, the elapsed time of Step 4 is 8.1 seconds, which is the time taken to write the write block of the block 3. At this point, the writing unit 107 selects, as a write block, the compressed block (190 MB) of the block 4 which is compressed by the algorithm C and is indicated in the comparison result information stored in the comparison result information storage unit 151, and writes the selected block compressed by the algorithm C to the tape storage 120 in the next step.

Subsequently, in Example of this embodiment, compression of the block 5 and writing of the write block of the block 4 illustrated in FIG. 22B are performed. In this example, the writing unit 107 completes the writing of the block 4 of 190 MB after a lapse of 9.5 seconds from when compression of the block 5 is started, and the writing start determining unit 106 performs a writing start determination for the block 5. In this case, since the elapsed time for the block 4 is "8.1", the right-hand side of the determination conditional expression (1) is "8.1". Further, when 9.5 seconds are elapsed from when compression of the block 5 is started, as illustrated in FIG. 20, comparison result information on the compressed block of the block 5 generated by the algorithm D is stored in the comparison result information storage unit 151. Accordingly, upon completion of the writing of the write block of the block 4, the determination conditional expression (size of the smallest compressed block of the block 5 (109 MB)/writing speed (20 MB)=5.45≈5.5≦8.1) is satisfied. Therefore, compression of the block 5 is determined to be completed, and the compressed block of the block 5 generated by the algorithm D is selected as a write block of the block 5. Further, the elapsed time of Step 5 is 9.5 seconds, which is the time taken to write the write block of the block 4. At this point, the writing unit 107 selects, as a write block, the compressed block (109 MB) of the block 5 which is compressed by the algorithm D and is indicated in the comparison result information stored in the comparison result information storage unit 151, and writes the selected block compressed by the algorithm D to the tape storage 120 in the next step.

Subsequently, in Example of this embodiment, writing of the write block of the block 5 illustrated in FIG. 22C is performed. In this example, the writing unit 107 completes the writing of the block 5 of 109 MB after a lapse of 5.5 seconds from when writing of the write block of the block 5 is started.

Figure 24:
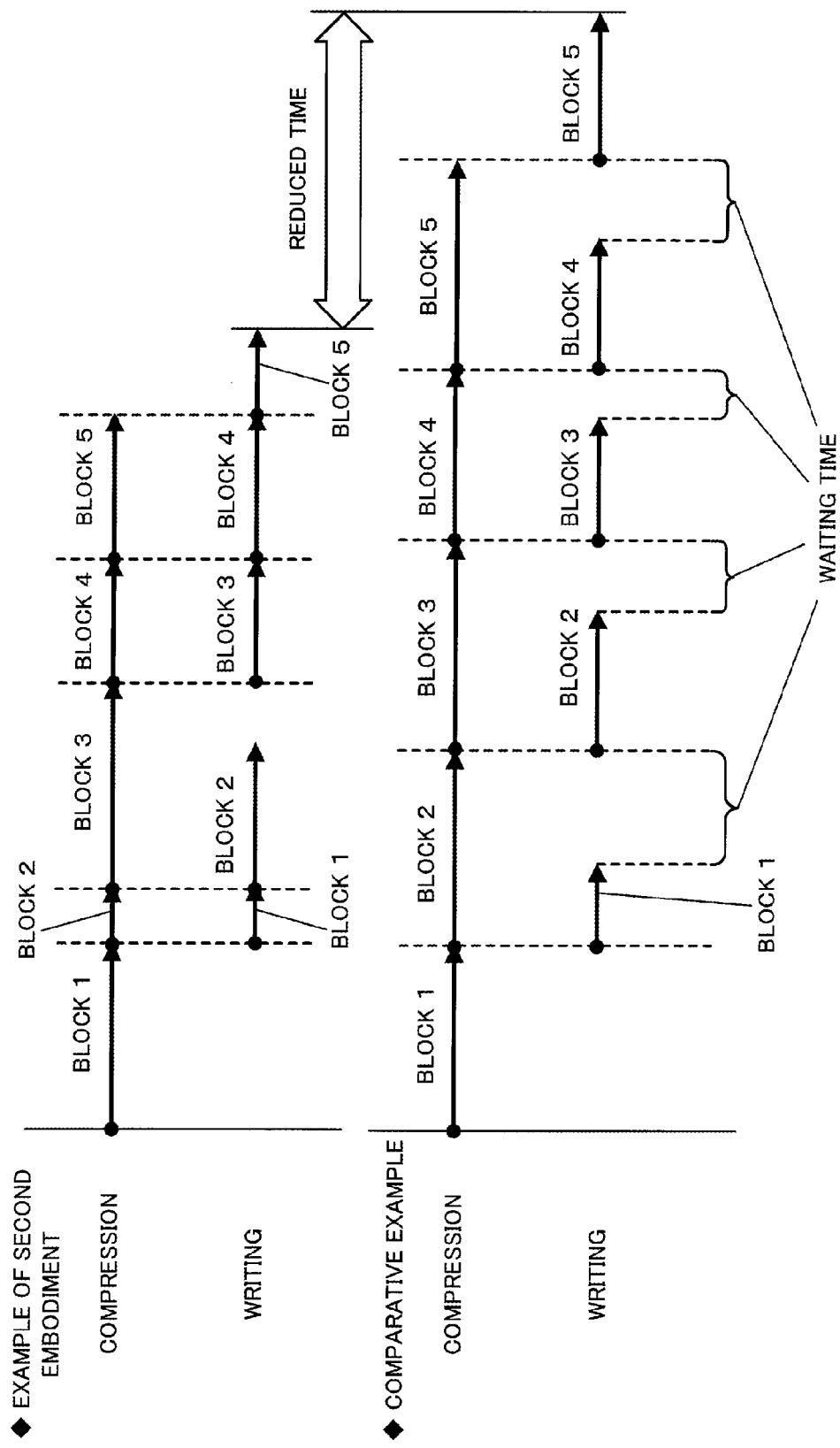
FIG. 24 is a time chart illustrating Example of the second embodiment and Comparative Example.

FIG. 23 illustrates a comparison of execution results of Example of the second embodiment and Comparative Example. FIG. 24 is a time chart illustrating Example of the second embodiment and Comparative Example. In FIGS. 23 and 24, Example of this embodiment illustrated in FIG. 20 through FIG. 22C and Comparative Example are compared with each other. In Comparative Example illustrated in FIGS. 23 and 24, a determination of whether to start compression and writing to a tape storage is made in accordance with a determination rule "select, as a write block, a block having the smallest size among blocks compressed by algorithms A through D, which are the same as those of the backup apparatus 100 of this embodiment, and an uncompressed block, when the time limit (15 seconds) elapses from when compression is started" under the setting conditions of FIG. 19.

As illustrated in FIGS. 23 and 24, in Example of this embodiment, the time taken to back up the blocks 1 through 5 is 53.1 seconds. On the other hand, in Comparative Example, the time taken to back up the blocks 1 through 5 is 69.5 seconds. According to these examples, the backup time in the backup apparatus 100 of this embodiment is reduced about 24% compared to that in Comparative Example.

Further, in Comparative Example, as illustrated in FIG. 24, since the time taken for compression is greater than the time taken for writing, there is waiting time in the writing process. Further, since the time taken for compression and the time taken for writing generally differ from each other, there is waiting time in either one of a compression process and a writing process which takes less time. On the other hand, according this embodiment, as in the case of compression of the block 2 and writing of the block 1, compression of the block 4 and writing of the block 3, and compression of the block 5 and writing of the block 4 illustrated in FIG. 24, for example, compression is terminated upon completion of writing in accordance with a determination by the writing start determining unit 106. Accordingly, waiting time in the writing process is reduced, which reduces the time taken for the entire backup process.

Note that although the backup apparatus 100 backs up the data 300a transmitted from the host computer 300, the configuration is not limited thereto. The backup apparatus 100 may back up data that are stored in and used by the backup apparatus 100, data transmitted from other computers, and data generated by the backup apparatus 100.

Further, although the backup apparatus 100 causes the dividing unit 102 to divide the data 300a transmitted from the host computer 300 so as to generate blocks 300b, the configuration is not limited thereto. The backup apparatus 100 may receive from the host computer 300 blocks 300b that are already divided, and sequentially process the received blocks 300b, starting with the first block 300b.

As described above, in the backup apparatus 100 of the second embodiment, the writing start determining unit 106 performs a start determination, and decides whether to start writing of a compressed block and compression of the next block on the basis of the result of the start determination. Further, in the case where a start decision is made by the writing start determining unit 106, a compression operation that is not completed is terminated, and a block having the smallest size among compressed blocks that are already generated at that moment is selected as a write block. Then, the writing unit 107 starts writing the selected write block, and the compressing unit 103 starts compressing the next block. With this configuration, it is possible to increase the speed of writing process while preventing a reduction in compression rate.

Further, the comparing unit 105 performs a comparison on an uncompressed block such that the uncompressed block may be selected as a write block. Therefore, for example, in the case where all the algorithms need a long time to compress a block, and in the case where the size of a write block to be written in parallel with a compression process is small, it is possible to reduce the processing time.

Further, when the time limit elapses from when compression is started, the writing start determining unit 106 makes a start decision, and terminates compression so as to select a write block from compressed blocks that are already generated by that time. Therefore, for example, in the case where all the algorithms need a long time to compress a block, it is possible to reduce the processing time.

Further, in the case where all the algorithms complete compression, the writing start determining unit 106 makes a start decision so as to select a write block. Therefore, for example, in the case where all the algorithms complete compression of a block in a short time, and in other cases, it is possible to reduce the processing time.

Further, the comparing unit 105 performs a comparison of the size of compressed blocks every time any of the algorithm executing units 103a through 103d completes a compression operation. Therefore, if a compressed block having a smaller size is generated, comparison result information may be immediately updated. This makes it possible to reduce the processing time.

Further, the writing start determining unit 106 performs a start determination when writing of the previous block is completed. Therefore, in the case where all the algorithms have completed generation of a compressed block and in the case where a compressed block having a sufficiently small size has been newly generated upon completion of writing of the previous block, it is possible to immediately proceed to the next writing and compression processes. This makes it possible to reduce the processing time.

Further, the writing start determining unit 106 performs a start determination when the comparison result information is updated by the comparing unit 105. Therefore, in the case where all the algorithms complete generation of a compressed block and in the case where a compressed block having a sufficiently small size is newly generated, it is possible to immediately proceed to the next writing and compression processes. This makes it possible to reduce the processing time.

Further, the writing start determining unit 106 performs a writing start determination every time a predetermined time elapses. Therefore, it is possible to determine, with simple processing, whether to perform a start determination. This makes it possible to prevent an increase in processing load and thus to reduce the processing time.

According to the data storage apparatus and the method of controlling a data storage apparatus disclosed above, it is possible to increase the speed of storing data while preventing a reduction in compression rate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. A data storage apparatus that performs, for each of a plurality of divided blocks of data to be stored, writing of a compressed block of one of the divided blocks and compression of next one of the divided blocks in parallel, the data storage apparatus comprising:
 a compressing unit including a plurality of algorithm executing units which compress one of the divided blocks of the data to be stored, using different algorithms in parallel, so as to generate compressed blocks, the compressing unit being configured to generate a plural- ity of types of compressed blocks for each one of the divided blocks by using the plurality of algorithm executing units;

a storage unit configured to store comparison result information indicating one of the compressed blocks generated by the compressing unit and the size of the compressed block;

a comparing unit configured to compare sizes of the compressed blocks generated by the respective algorithm executing units, and store, in the storage unit, comparison result information on a compressed block having the smallest size among the compressed blocks;

a block storage unit to which the compressed block is written;

a writing start determining unit configured to perform a start determination to determine whether a quotient obtained by dividing the size of the compressed block that is indicated in the comparison result information stored in the storage unit by a writing speed of writing the compressed block is less than or equal to an elapsed time from when compression of a previous divided block is started to when writing thereof is started and, when the quotient is determined to be less than or equal to the elapsed time, makes a decision to start writing of the generated compressed block to the block storage unit and compression of a next block of the data to be stored; and a writing unit configured to, when the start decision is made by the writing start determining unit, select as a write block a compressed block having the smallest size among the compressed blocks generated by the compressing unit at the time the start decision is made by the writing start determining unit, on the basis of the comparison result information stored in the storage unit, and write the selected write block to the block storage unit.

2. The data storage apparatus according to claim 1, wherein the comparing unit compares sizes of the compressed blocks generated by the respective algorithm executing units and a size of the divided block that is not compressed, and store, in the storage unit, comparison result information on a block having the smallest size among the compressed blocks generated by the respective algorithm executing units and the divided block that is not compressed.

3. The data storage apparatus according to claim 1, wherein the writing start determining unit determines, in the start determination, whether a predetermined time has elapsed from the start of compression of the divided block by the compressing unit and, when the predetermined time is determined to have elapsed, makes a decision to start writing of the generated compressed block to the block storage unit and compression of a next block of the data to be stored.

4. The data storage apparatus according to claim 1, wherein the writing start determining unit determines, in the start determination, whether all the algorithm executing units have completed compression of the divided block and, when all the algorithm executing units are determined to have completed compression of the divided block, makes a decision to start writing of the generated compressed block to the block storage unit and compression of a next block of the data to be stored.

5. The data storage apparatus according to claim 1, wherein the comparing unit compares, each time compression is completed by any of the algorithm executing units, the size of the compressed block indicated in the comparison result information stored in the storage unit with a size of a compressed block that is newly generated by the algorithm executing unit and, when the size of the compressed block that is newly generated by the algorithm executing unit is less, updates the comparison result information stored in the storage unit with comparison result information on the compressed block that is newly generated by the algorithm executing unit.

6. The data storage apparatus according to claim 1, wherein the writing start determining unit performs the start determination when the writing unit completes writing of a previous write block.

7. The data storage apparatus according to claim 1, wherein the writing start determining unit performs the start determination when the comparison result information stored in the storage unit is updated by the comparing unit.

8. The data storage apparatus according to claim 1, wherein the writing start determining unit performs the start determination each time a predetermined time elapses.

9. A method of controlling a data storage apparatus that performs, for each of a plurality of divided blocks of data to be stored, writing of a compressed block of one of the divided blocks and compression of next one of the divided blocks in parallel, the method comprising:

compressing, by a compressing unit, one of the divided blocks of the data to be stored so as to generate a plurality of types of compressed blocks, by using a plurality of algorithm executing units which perform compression using different algorithms in parallel;

comparing, by a comparing unit, sizes of the compressed blocks generated by the plurality of algorithm executing units, and storing, in a storage unit, comparison result information indicating a compressed block having the smallest size among the compressed blocks and the size of the compressed block;

determining, by a writing start determining unit, whether a quotient obtained by dividing the size of the compressed block that is indicated in the comparison result information stored in the storage unit by a writing speed of writing the compressed block is less than or equal to an elapsed time from when compression of a previous divided block is started to when writing thereof is started;

makes, by the writing start determining unit, a decision to start writing of the generated compressed block to the block storage unit and compression of a next block of the data to be stored, when the quotient is determined to be less than or equal to the elapsed time;

selecting, when the start decision is made by the writing start determining unit, by a writing unit, as a write block a compressed block having the smallest size among the compressed blocks generated by the compressing unit at the time the start decision is made by the writing start determining unit, on the basis of the comparison result information stored in the storage unit; and writing, by the writing unit, the selected write block to a block storage unit.

* * * * *